United States Patent
Kamran et al.

(10) Patent No.: US 11,232,010 B2
(45) Date of Patent: Jan. 25, 2022

(54) PERFORMANCE MONITORING FOR STORAGE SYSTEM WITH CORE THREAD COMPRISING INTERNAL AND EXTERNAL SCHEDULERS

(71) Applicant: EMC IP Holding Company LLC, Hopkinton, MA (US)

(72) Inventors: Lior Kamran, Rishon LeZion (IL); Vladimir Kleiner, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/747,138

(22) Filed: Jan. 20, 2020

(65) Prior Publication Data
US 2021/0224177 A1    Jul. 22, 2021

(51) Int. Cl.
| | | |
|---|---|---|
| G06F 9/455 | (2018.01) | |
| G06F 11/34 | (2006.01) | |
| G06F 9/38 | (2018.01) | |
| G06F 9/48 | (2006.01) | |
| G06F 11/30 | (2006.01) | |

(52) U.S. Cl.
CPC ........ *G06F 11/3409* (2013.01); *G06F 9/3836* (2013.01); *G06F 9/4881* (2013.01); *G06F 11/3017* (2013.01)

(58) Field of Classification Search
CPC .................................................. G06F 9/4881
USPC .............................................................. 718/1
See application file for complete search history.

(56) References Cited

U.S. PATENT DOCUMENTS

| | | | | |
|---|---|---|---|---|
| 7,444,464 B2 * | 10/2008 | Urmston | ........... | G06F 16/90339 |
| | | | | 711/108 |
| 8,095,726 B1 * | 1/2012 | O'Connell | .......... | G06F 12/1018 |
| | | | | 711/108 |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mehran Kamran
(74) *Attorney, Agent, or Firm* — Ryan, Mason & Lewis, LLP

(57) ABSTRACT

A processing device monitors performance of a first thread of a first application executing on one of a plurality of processing cores of a storage system. The first thread comprises an internal scheduler controlling switching between a plurality of sub-threads of the first thread, and an external scheduler controlling release of the processing core by the first thread for use by at least a second thread of a second application different than the first application. In conjunction with monitoring the performance of the first thread in executing the first application, the processing device maintains a cumulative suspend time of the first thread over multiple suspensions of the first thread, with one or more of the multiple suspensions allowing at least the second thread of the second application to execute on the processing core, and generates performance measurements for sub-threads of the first thread using the cumulative suspend time.

20 Claims, 9 Drawing Sheets

(56) References Cited

U.S. PATENT DOCUMENTS

| | | | | |
|---|---|---|---|---|
| 8,214,612 | B1* | 7/2012 | Natanzon | G06F 11/1612 |
| | | | | 711/162 |
| 8,301,593 | B2* | 10/2012 | Hoffmann | G06F 11/2097 |
| | | | | 707/615 |
| 9,104,326 | B2* | 8/2015 | Frank | G06F 3/0641 |
| 9,208,162 | B1* | 12/2015 | Hallak | G06F 16/9014 |
| 9,286,003 | B1* | 3/2016 | Hallak | G06F 16/9014 |
| 9,552,258 | B2* | 1/2017 | Hallak | G06F 11/1076 |
| 9,582,337 | B2* | 2/2017 | Malki | G06F 9/485 |
| 9,606,870 | B1* | 3/2017 | Meiri | G06F 3/0661 |
| 9,716,754 | B2* | 7/2017 | Swift | G06F 3/0619 |
| 10,152,232 | B1* | 12/2018 | Kleiner | G06F 11/3409 |
| 10,176,046 | B1* | 1/2019 | Hu | G06F 11/1446 |
| 10,261,693 | B1* | 4/2019 | Schneider | G06F 12/109 |
| 10,324,640 | B1* | 6/2019 | Chen | G06F 3/065 |
| 10,338,851 | B1* | 7/2019 | Kronrod | G06F 3/0659 |
| 10,359,965 | B1* | 7/2019 | Stronge | G06F 3/0619 |
| 10,394,485 | B1* | 8/2019 | Chen | G06F 3/0604 |
| 10,437,501 | B1* | 10/2019 | Kucherov | G06F 3/0679 |
| 10,437,855 | B1* | 10/2019 | Strange | G06F 11/2074 |
| 10,466,925 | B1* | 11/2019 | Blanco | G06F 3/067 |
| 10,474,496 | B1* | 11/2019 | Kamran | G06F 3/0611 |
| 10,496,324 | B2* | 12/2019 | Meiri | G06F 3/067 |
| 10,496,489 | B1* | 12/2019 | Chen | G06F 3/065 |
| 10,496,672 | B2 | 12/2019 | Meiri et al. | |
| 11,055,028 | B1* | 7/2021 | Kamran | G06F 3/0611 |
| 2002/0099760 | A1* | 7/2002 | Liang | G06F 11/3466 |
| | | | | 718/107 |
| 2008/0279462 | A1* | 11/2008 | Celi, Jr. | H04L 69/04 |
| | | | | 382/232 |
| 2009/0132955 | A1* | 5/2009 | Garg | H04L 9/3247 |
| | | | | 715/781 |
| 2010/0179941 | A1* | 7/2010 | Agrawal | G06F 11/1451 |
| | | | | 707/624 |
| 2013/0007765 | A1* | 1/2013 | Yamashita | G06F 9/4881 |
| | | | | 718/107 |
| 2013/0325824 | A1* | 12/2013 | Shoens | G06F 16/16 |
| | | | | 707/698 |
| 2014/0181016 | A1* | 6/2014 | Whitehead | G06F 11/1464 |
| | | | | 707/613 |
| 2015/0378785 | A1* | 12/2015 | Tarasuk-Levin | G06F 9/45558 |
| | | | | 718/1 |
| 2016/0150012 | A1* | 5/2016 | Barszczak | G06F 3/067 |
| | | | | 709/219 |
| 2016/0170987 | A1* | 6/2016 | Kesselman | G06F 16/2255 |
| | | | | 707/747 |
| 2016/0202927 | A1* | 7/2016 | Klarakis | G06F 3/065 |
| | | | | 709/217 |
| 2016/0224259 | A1* | 8/2016 | Ahrens | G06F 3/0619 |
| 2017/0192857 | A1* | 7/2017 | Meiri | G06F 16/273 |
| 2018/0309687 | A1* | 10/2018 | Matsuo | H04L 47/26 |
| 2019/0303490 | A1* | 10/2019 | Chen | G06F 16/275 |
| 2020/0034266 | A1* | 1/2020 | Kleiner | G06F 11/3485 |
| 2020/0233705 | A1* | 7/2020 | Alkalay | G06F 9/485 |
| 2021/0124619 | A1* | 4/2021 | Kamran | G06F 9/5038 |
| 2021/0224171 | A1* | 7/2021 | Soukhman | G06F 11/3034 |

OTHER PUBLICATIONS

EMC Corporation, "Unstoppable Data Reduction: Always-on, in-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

U.S. Appl. No. 15/793,121 filed in the name of David Meiri et al. Oct. 25, 2017, and entitled "Opportunistic Compression of Replicated Data in a Content Addressable Storage System."

U.S. Appl. No. 15/662,708 filed in the name of Xiangping Chen et al. Jul. 28, 2017, and entitled "Token-Based Data Flow Control in a Clustered Storage System."

U.S. Appl. No. 15/824,536 filed in the name of Christopher Sayles et al. Nov. 28, 2017, and entitled "Storage System with Asynchronous Messaging between Processing Modules for Data Replication."

U.S. Appl. No. 16/037,050 filed in the name of Ying Hu et al. Jul. 17, 2018, and entitled "Storage System with Multiple Write Journals Supporting Synchronous Replication Failure Recovery."

U.S. Appl. No. 16/253,793 filed in the name of Yuval Harduf et al. Jan. 22, 2019, and entitled "Storage System with Data Consistency Checking in Synchronous Replication Using Active Snapshot Set."

U.S. Appl. No. 16/396,897 filed in the name of Anton Kucherov et al. Apr. 29, 2019, and entitled "Storage System with Deduplication-Aware Replication Implemented Using a Standard Storage Command Protocol."

U.S. Appl. No. 16/413,050 filed in the name of Xiangping Chen et al. May 15, 2019, and entitled "Storage System with Coordinated Recovery across Multiple Input-Output Journals of Different Types."

U.S. Appl. No. 16/265,131 filed in the name of Lior Kamran et al. Feb. 1, 2019, and entitled "Storage System with Write Cache Release Protection."

U.S. Appl. No. 16/251,779 filed in the name of Amitai Alkalay et al. Jan. 18, 2019, and entitled "Multi-Core Processor in Storage System Executing Dedicated Polling Thread for Increased Core Availability."

U.S. Appl. No. 16/251,868 filed in the name of Amitai Alkalay et al. Jan. 18, 2019, and entitled "Multi-Core Processor in Storage System Executing Dynamic Thread for Increased Core Availability."

* cited by examiner

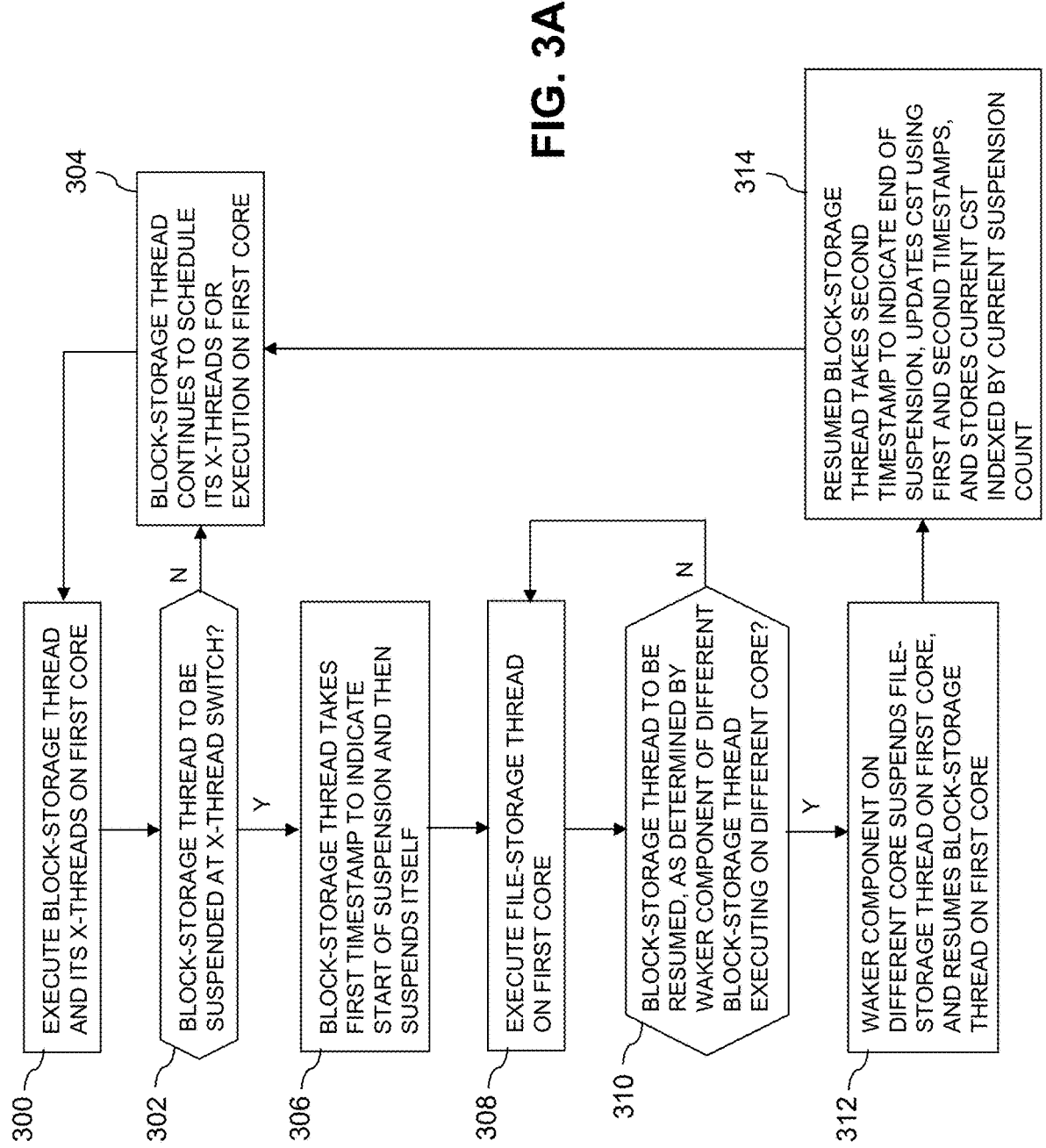

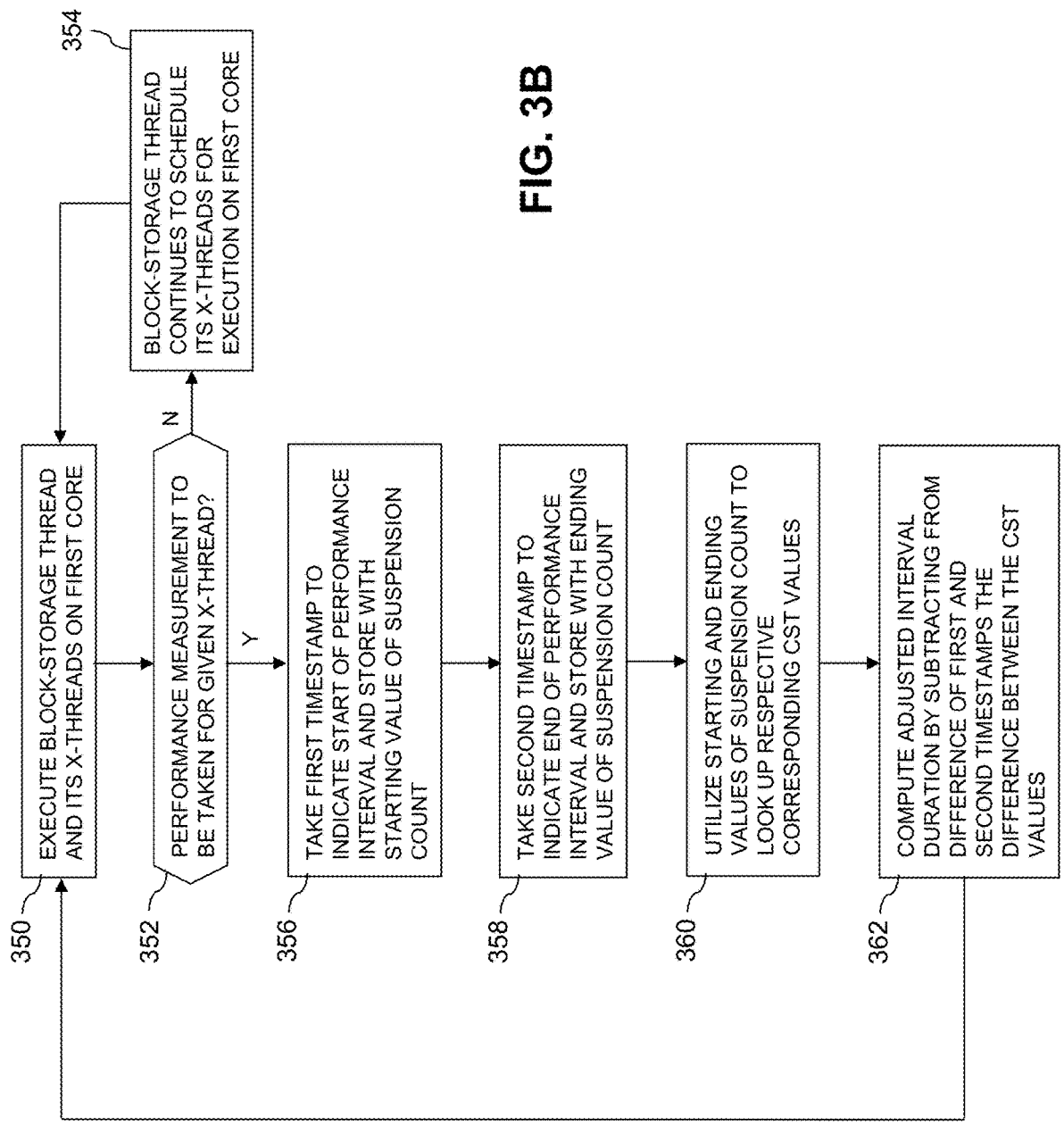

```
While (TRUE) {
    external_scheduler_cycle()
    xth = pick_next_xthread_to_run()
    schedule(xth)
}
```

400

```
// CPU release component
If (should_release_cpu()) {
    suspend_start = curr_timestamp()
    release_cpu()
    // reaching this line where the TRUCK resumed
    suspend_end = curr_timestamp()
    CST[NumSuspends] = suspend_end – suspend_start
    NumSuspends = NumSuspends + 1
}
```

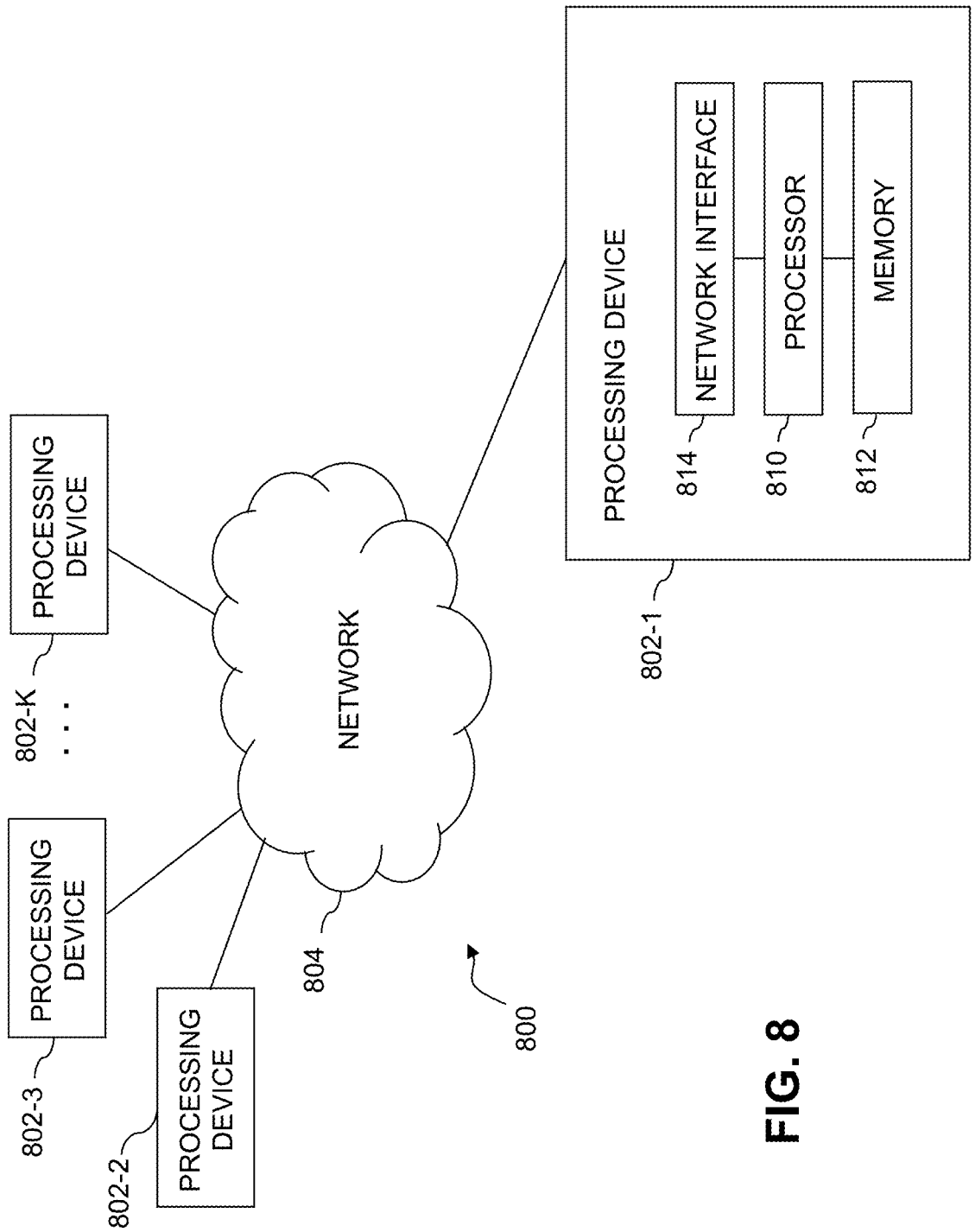

PERFORMANCE MONITORING FOR STORAGE SYSTEM WITH CORE THREAD COMPRISING INTERNAL AND EXTERNAL SCHEDULERS

FIELD

The field relates generally to information processing systems, and more particularly to storage in information processing systems.

BACKGROUND

Information processing systems often include distributed storage systems comprising multiple nodes. Nodes of a distributed storage system may each include multi-core processors that are configured to execute threads associated with various applications. One or more processing cores of a given such multi-core processor illustratively execute the threads associated with a particular application. In some instances, an application may utilize an always-polling model in which threads executing on one or more processing cores poll interfaces of the information processing system for new tasks, events, or other data. In other instances, an application may use an event-driven model in which interrupts are used to activate threads for processing a task, event or other data using the one or more processing cores. Performance monitoring techniques are typically used to monitor the performance of such core threads in these and other contexts, but in some cases inaccurate measurements can result when a given processing core is used to execute multiple threads of different applications.

SUMMARY

Illustrative embodiments provide performance monitoring techniques for storage systems with core threads each comprising internal and external schedulers. Such arrangements can provide substantially improved performance measurement accuracy in situations in which a given processing core of a storage system is used to execute multiple threads of different applications. For example, some embodiments are advantageously configured to generate highly accurate performance measurements for respective sub-threads of a given thread of a primary storage application executing on a processing core, even in situations in which that thread is repeatedly suspended in order to allow one or more threads of one or more other applications to execute on the same processing core.

In one embodiment, at least one processing device comprises a processor coupled to a memory, and is configured to monitor performance of a first thread of a first application executing on one of a plurality of processing cores of a storage system. The first thread comprises an internal scheduler configured to control switching between a plurality of sub-threads of the first thread, and an external scheduler configured to control release of the processing core by the first thread for use by at least a second thread of a second application different than the first application. In conjunction with monitoring the performance of the first thread in executing the first application, the processing device maintains a cumulative suspend time of the first thread over multiple suspensions of the first thread, with one or more of the multiple suspensions allowing at least the second thread of the second application to execute on the processing core. The processing device generates performance measurements for respective ones of the sub-threads of the first thread based at least in part on the cumulative suspend time of the first thread. The processing device in some embodiments comprises at least a subset of the plurality of processing cores of the storage system, although other arrangements are possible.

The first and second applications in some embodiments comprise respective block-storage and file-storage applications of the storage system. Additional or alternative applications can be used in other embodiments.

The first thread in some embodiments comprises a truck thread that when executing on the processing core is configured to utilize substantially all available processing resources of the processing core, although it is to be appreciated that other types of threads can be used as the first thread in other embodiments.

Each of the sub-threads of the first thread is illustratively in one of multiple designated states at a particular point in time, such as, for example, a running state, a ready state and a suspended state.

In some embodiments, the sub-threads comprise respective non-preemptive threads and the first thread is configured such that no sub-thread in the running state is suspended to allow release of the processing core by the first thread for use by the second thread. Instead, the multiple suspensions of the first thread each occur in conjunction with a switch between sub-threads of the first thread.

In generating performance measurements for respective ones of the sub-threads of the first thread based at least in part on the cumulative suspend time of the first thread, some embodiments generate a ready time measurement for a particular one of the sub-threads, and adjust the ready time measurement based at least in part on the cumulative suspend time of the first thread, with the adjusted ready time measurement being indicative of an amount of time the sub-thread spent in the ready state while the first thread was not suspended. Similarly, some embodiments generate a suspend time measurement for a particular one of the sub-threads, and adjust the suspend time measurement based at least in part on the cumulative suspend time of the first thread, with the adjusted suspend time measurement being indicative of an amount of time the sub-thread spent in the suspended state while the first thread was not suspended. Other types of measurements can be generated in other embodiments.

In some embodiments, maintaining a cumulative suspend time of the first thread over multiple suspensions of the first thread comprises, for each of the multiple suspensions of the first thread, taking a first timestamp to indicate start of the suspension, taking a second timestamp to indicate resumption of the first thread from the suspension, and adding a time interval corresponding to a difference between the first and second timestamps to the cumulative suspend time.

Additionally or alternatively, maintaining a cumulative suspend time of the first thread over multiple suspensions of the first thread in some embodiments comprises, for each of the multiple suspensions of the first thread, storing a current value of the cumulative suspend time in association with a current value of a suspension number counter that is incremented with each of the multiple suspensions of the first thread.

In some embodiments, generating performance measurements for respective ones of the sub-threads of the first thread based at least in part on the cumulative suspend time of the first thread comprises taking a first timestamp to indicate start of a performance interval, storing a starting value of the suspension number counter in conjunction with taking the first timestamp, taking a second timestamp to indicate end of the performance interval, storing an ending value of the suspension number counter in conjunction with taking the second timestamp, utilizing the starting and ending values of the suspension number counter to determine respective corresponding values of the cumulative suspend time of the first thread, and adjusting a difference between the first and second timestamps based at least in part on a difference between the corresponding values of the cumulative suspend time of the first thread.

These and other illustrative embodiments include, without limitation, apparatus, systems, methods and processor-readable storage media.

BRIEF DESCRIPTION OF THE DRAWINGS

FIGS. 3A and 3B are flow diagrams of different portions of an example performance monitoring process for a core thread with internal and external schedulers in an illustrative embodiment. These figures are collectively referred to herein as FIG. 3.

FIG. 4 shows example pseudocode for portions of a core thread with internal and external schedulers in an illustrative embodiment.

FIGS. 7 and 8 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
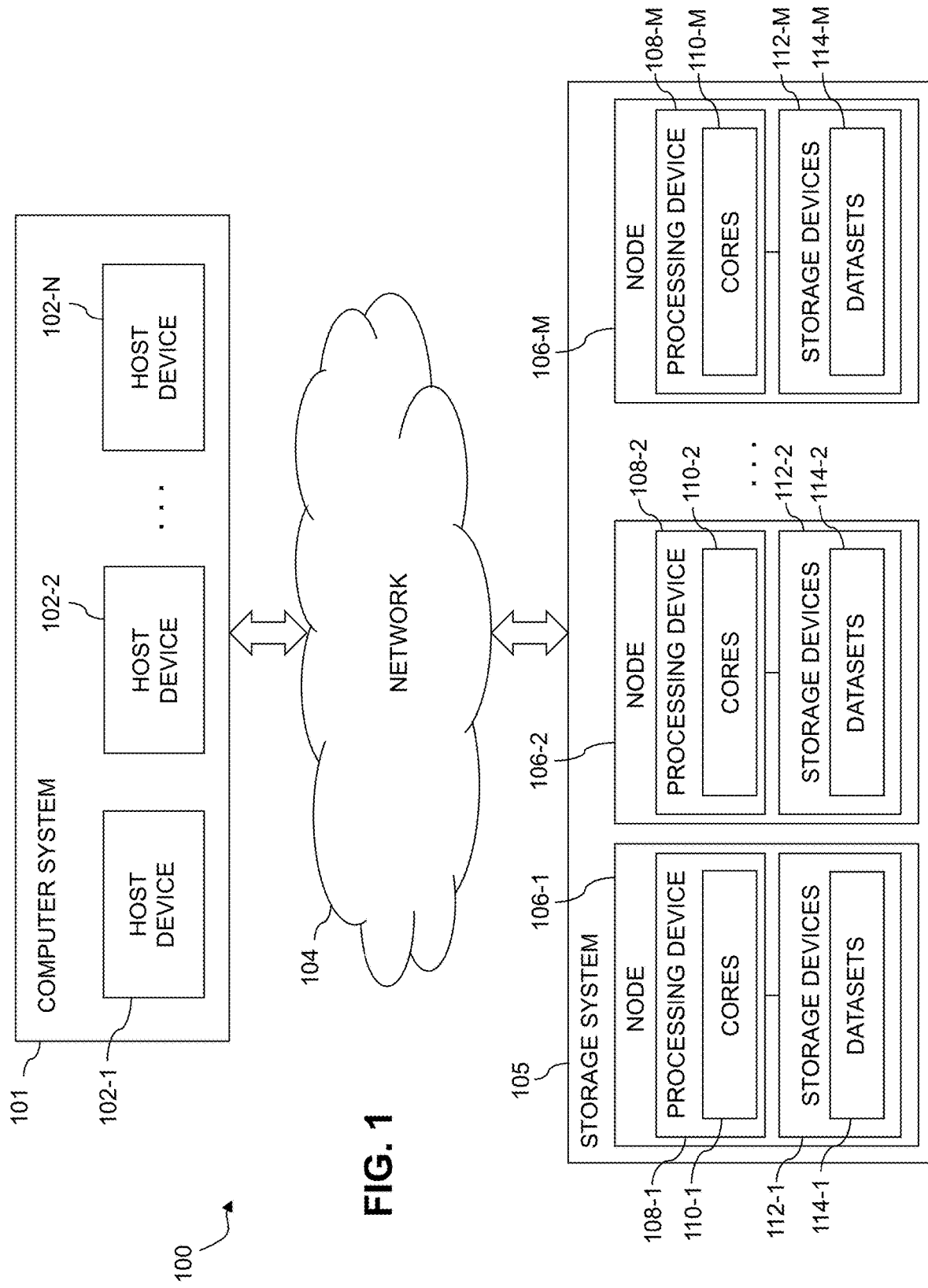
FIG. 1 is a block diagram of an information processing system comprising a storage system configured with performance monitoring functionality for a core thread with internal and external schedulers in an illustrative embodiment.

FIG. 1 shows an information processing system 100 configured in accordance with an illustrative embodiment.

The information processing system 100 comprises a computer system 101 that includes host devices 102-1, 102-2, . . . 102-N, collectively referred to herein as host devices 102. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102. Such applications illustratively generate input-output (IO) operations that are processed by the storage system 105. The term "input-output" as used herein refers to at least one of input and output. For example, IO operations may comprise write requests and/or read requests directed to logical addresses of a particular logical storage volume of the storage system 105. These and other types of IO operations are also generally referred to herein as IO requests.

The host devices 102 and storage system 105 illustratively comprise respective processing devices of one or more processing platforms. For example, the host devices 102 and the storage system 105 can each comprise one or more processing devices each comprising a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network such as a 4G or 5G network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of nodes 106-1, 106-2, . . . 106-M, collectively referred to herein as nodes 106. The storage system 105 comprising nodes 106 is an example of what is also referred to herein as a "distributed storage system" or a "clustered storage system." For example, in some implementations of storage system 105, the nodes 106 are interconnected in a full mesh network, such that each of the nodes 106 can communicate with each of the other nodes 106, although other types of networks and different node interconnection arrangements can be used in other embodiments. At least portions of respective ones of the nodes 106 illustratively implement what is generally referred to herein as a "distributed storage controller" of the storage system 105.

In the FIG. 1 embodiment, the nodes 106-1, 106-2, . . . 106-M of the storage system 105 comprise respective processing devices 108-1, 108-2, . . . 108-M, collectively referred to herein as processing devices 108. One or more of the nodes 106 may each comprise multiple processing devices 108, although only single instances of such processing devices are shown in the figure. In some embodiments, multiple processing devices 108 of a given one of the nodes 106 may act or function as a single processing device 108.

The processing devices 108-1, 108-2, . . . 108-M comprise respective sets of cores 110-1, 110-2, . . . 110-M, collectively referred to herein as cores 110. For example, a given processing device 108 may comprise a set of two cores 110, four cores 110, eight cores 110, or any other number of cores 110 appropriate to a given implementation. The processing devices 108 therefore each illustratively comprise a multi-core processor and associated memory.

The nodes 106-1, 106-2, . . . 106-M further comprise respective sets of storage devices 112-1, 112-2, . . . 112-M, collectively referred to herein as storage devices 112. For example, a given one of the nodes 106 may comprise a single storage device 112, two storage devices 112, four storage devices 112, eight storage devices 112, sixteen storage devices 112, thirty-two storage devices 112 or any other number of storage devices 112. The storage devices 112-1, 112-2, . . . 112-M store respective datasets 114-1, 114-2, . . . 114-M, collectively referred to herein as datasets 114, which illustratively comprise logical units (LUNs) or other types of logical storage volumes, as well as snapshots and/or other arrangements of data, possibly including associated metadata, as in an embodiment in which storage devices 112 store user data pages and metadata pages of LUNs or other logical storage volumes.

The storage devices 112 of the storage system 105 illustratively comprise solid state drives (SSDs). Such SSDs are implemented using non-volatile memory (NVM) devices such as flash memory. Other types of NVM devices that can be used to implement at least a portion of the storage devices 112 include non-volatile random access memory (NVRAM), phase-change RAM (PC-RAM), magnetic RAM (MRAM), resistive RAM (RRAM), spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in storage system 105 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 105 illustratively comprises a scale-out all-flash content addressable storage array such as an XtremIO™ storage array from Dell EMC of Hopkinton, Mass. A wide variety of other types of storage arrays can be used in implementing the storage system 105 in other embodiments, including by way of example one or more VNX®, VMAX®, Unity™ or PowerMax™ storage arrays, each commercially available from Dell EMC.

Additional or alternative types of storage products that can be used in implementing a given storage system in illustrative embodiments include, by way of example, software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to storage systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

The storage system 105 should also be understood to include additional modules and other components typically found in conventional implementations of storage systems, although such additional modules and other components are omitted from the figure for clarity and simplicity of illustration.

In some embodiments, communications between the host devices 102 and the storage system 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 102 to communicate with the storage system 105 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

As indicated previously, the host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102. In the FIG. 1 embodiment, storage system 105 is implemented as a distributed or clustered storage system comprising nodes 106 that may be logically or physically distributed.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 7 and 8.

It is to be appreciated that the above-described features and other features of illustrative embodiments disclosed herein are presented by way of example only and should not be construed as limiting in any way.

The particular sets of modules and other components implemented in the system 100 as illustrated in FIG. 1 are therefore presented by way of illustrative example only. In other embodiments, only subsets of these components, or additional or alternative sets of components, may be used, and such components may exhibit alternative functionality and configurations. Accordingly, different numbers, types and arrangements of system components such as host devices 102, network 104, storage system 105, nodes 106, processing devices 108, cores 110, storage devices 112, and datasets 114, or additional or alternative components, can be used in other embodiments.

Also, in some embodiments, the core thread performance monitoring functionality described herein can be implemented at least in part in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

Figure 2:
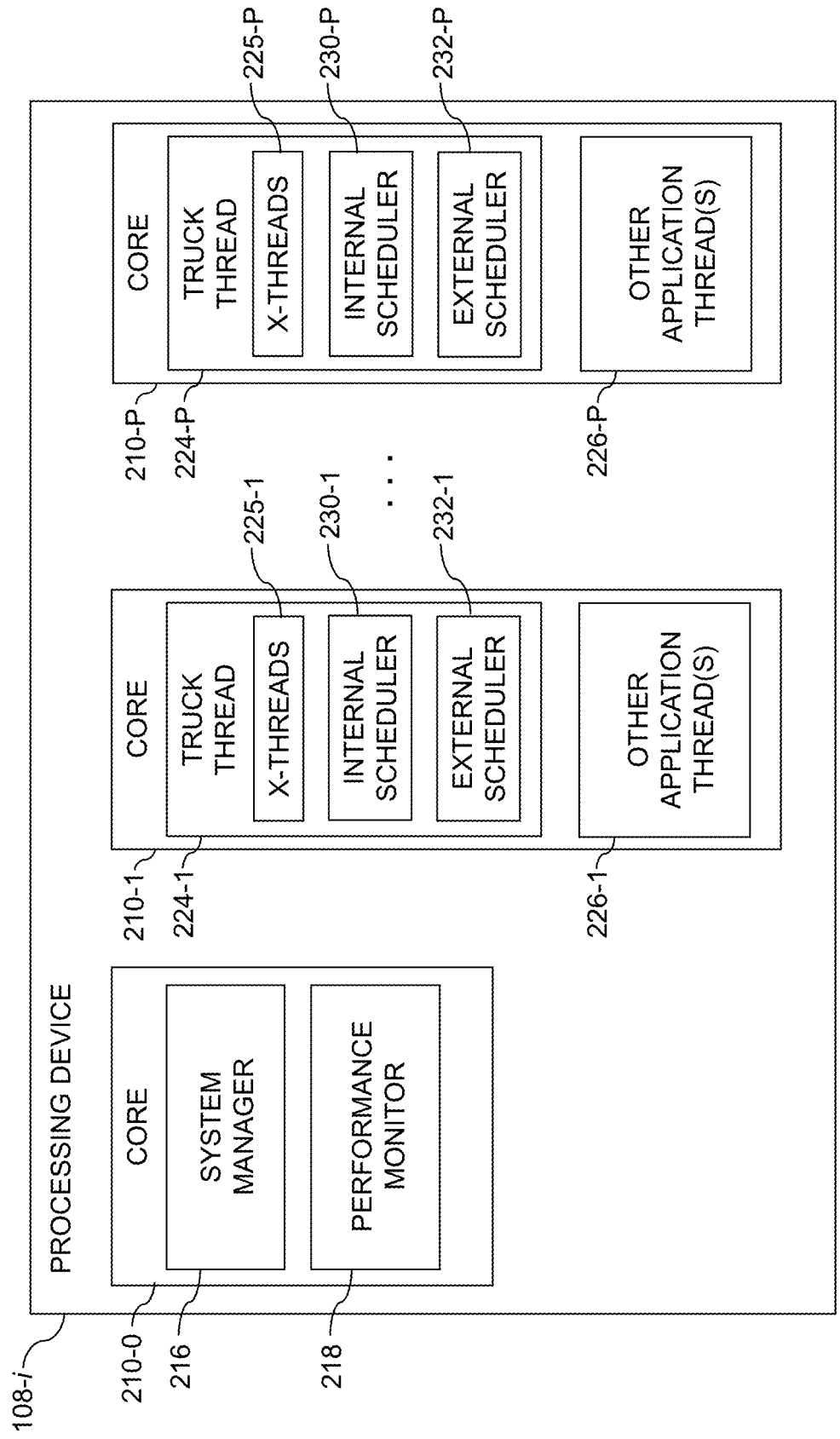
FIG. 2 is a block diagram of a processing device of the information processing system of FIG. 1 comprising a plurality of processing cores each executing a truck thread with internal and external schedulers in an illustrative embodiment.

Referring now to FIG. 2, a given one of the processing devices 108, denoted as processing device 108-$i$, where $i=1$, 2, . . . M, is shown in more detail. The processing device 108-$i$ in this embodiment comprises a multi-core processor including processing cores 210-0, 210-1, . . . 210-P. The processing core 210-0 implements a system manager 216 and a performance monitor 218. The other processing cores 210-1 through 210-P execute respective truck threads 224-1 through 224-P, comprising respective sets of multiple sub-threads illustratively in the form of X-threads 225-1 through 225-P. Other types of sub-threads can be used in other embodiments. The processing cores 210-1 through 210-P also execute respective sets of one or more other application threads 226-1 through 226-P. These and other threads illustratively comprise operating system (OS) threads of their respective cores 210.

For example, in the case of a block-storage application, which handles the block-based storage functionality of the storage system 105, the block-storage application executes truck threads 224 on respective ones of the cores 210 of the processing device 108-$i$. These truck threads 224 implement the block-storage application functionality. In some embodiments, each of the truck threads 224 may be hard affined to a particular one of the processing cores 210, such that it may only execute on that particular core.

The processing cores 210 in some embodiments illustratively comprise respective distinct central processing units (CPUs). Accordingly, each of the processing devices 108 of the respective nodes 106 of storage system 105 may be viewed as comprising a multi-core CPU and an associated storage array comprising a set of storage devices 112, although numerous other arrangements are possible. The storage array or other arrangement of storage devices 112 associated with a given one of the nodes 106 may comprise, for example, a disk array enclosure (DAE), although such references herein to "disks" should not be construed as an indication that the storage devices are limited to HDDs or other rotating magnetic storage media.

The above-noted multi-core CPU illustratively runs the block-storage application on top of a preemptive OS, where a preemptive OS can preempt (e.g., stop) a running OS thread without its cooperation, and execute something else, such as another OS thread. The block-storage application is illustratively running a single hard-affined OS thread per each CPU core, which implements the block-storage functionality. This OS thread is an example of what is also referred to herein as a "truck thread." Truck threads and other application threads running on a given CPU core or other processing core are more generally referred to herein as "core threads" of that processing core.

As part of its operation, each of the truck threads 224 polls a corresponding set of interfaces of the storage system 105 for tasks, events, or other data to be processed by that truck thread. For example, the set of interfaces may include an interface for indications of completions of submitted IO requests, an interface for IO requests from the user, and interfaces for other tasks, events, or other data. Any other interfaces may also be polled. Each truck thread, by design, fully utilizes the processing core that it is executing on for both interface polling and processing of the corresponding tasks, events, or other data. For example, in illustrative embodiments, each truck thread is designed to fully utilize the processing core that it is executing on because, even when there is no actual processing of tasks to be performed, the truck thread continues checking its respective interfaces via polling. This design is optimized for a storage system that requires low latency and high IO operations per second (IOPS) since no context switches or interrupts are required to perform the processing. In some embodiments, the functionality of the block-storage application may be described as an always-polling model.

In some embodiments, example interfaces that may be polled by a truck thread may include a front-end interface, a remote procedure call (RPC) messaging interface, a remote direct memory access (RDMA) messaging interface, and a back-end interface. In some embodiments, any other interface commonly used in a storage system may also be polled by the truck thread. In some embodiments, each truck thread defines an IO-provider instance for each corresponding interface that it is responsible for polling.

The front-end interface illustratively comprises an interface for receiving and replying to IO requests from users of the storage system 105 associated with respective ones of the host devices 102. For example, a given truck thread may comprise a front-end IO-provider instance that polls for new IO requests from one or more host devices 102 or other system users. In some embodiments, for example, IO requests received by the storage system 105 from the user are pooled together in a common pool that is shared between the truck threads 224 and accessed using a front-end IO-provider instance.

The RPC messaging interface illustratively comprises an interface for sending and receiving messages to and from other nodes 106 of the storage system 105. For example, a given truck thread may comprise an RPC messaging IO-provider that polls for new messages from other nodes 106 in the storage system 105. As an example, when one of the nodes 106 sends an IO request to another one of the nodes 106, the sender node selects the specific destination truck thread, that is, the truck thread that will receive and handle the request.

The RDMA messaging interface illustratively comprises an interface for RDMA transfer of buffers between nodes 106. For example, a given truck thread may comprise an RDMA messaging IO-provider that polls for the completion of RDMA transfers between nodes 106.

The back-end interface illustratively comprises an interface for accessing the storage devices 112 in order to write data to and read data from the storage devices 112. For example, a given truck thread may comprise a back-end IO-provider that polls for the completion of write and read requests initiated by the truck thread to one or more of the storage devices 112 of processing device 108-$i$.

In some cases, the storage system 105 may also implement one or more other applications aside from the block-storage application. For example, a file-storage application that provides a file interface to a user of the information processing system 100 may also be implemented by the storage system 105, for example, by executing corresponding threads 226 on one or more of the cores 210. In some cases, the block-storage application and the file-storage application, or any other application, may be implemented by the storage system 105 simultaneously, each with a different load that can dynamically change over time.

Since these applications are attempting to utilize the same set of processing cores 210 simultaneously, management of the available processing resources of these cores 210 between the applications can be challenging. For example, since the block-storage application is implemented by executing truck threads 224 on each of the processing cores 210 of each of the nodes 106, and these truck threads 224 can utilize the full capacity of those processing cores 210, little to no processing resources of the storage system 105 may be available for use by threads 226 of another application.

In some embodiments, if only the file-storage application is actively in use, such that no tasks, events, or other data are present for the truck threads 224 to process, the associated file threads may only be able to utilize a portion of the processing resources of a core, such as 50% or another percentage, where the remaining portion, such as the other 50% or another percentage, will be used by the truck threads 224 just for polling interfaces. In cases where the block-storage application is actively performing operations, the truck threads 224 will utilize a substantial portion of the processing resources of the cores, such as 90%, 95%, or even 100%, to both poll the interfaces and process any tasks, events, or other data found on those interfaces during the polling, which leaves little to no processing resources available on those cores for use by other applications such as a file-storage application.

Examples of storage systems that allow the full processing resources of a core to be available for use by other applications, even when a truck thread of a block-storage application is utilizing that core to support its functionality, are disclosed in U.S. patent application Ser. No. 16/251,779, filed Jan. 18, 2019, now issued as U.S. Pat. No. 10,871,991, and entitled "Multi-Core Processor in Storage System Executing Dedicated Polling Thread for Increased Core Availability," which is incorporated by reference herein in its entirety. This patent application more particularly discloses a storage system that in one or more illustrative embodiments is able to dynamically adapt to the user operation patterns of multiple simultaneously implemented applications where, for example, one of the applications executes an always-polling model of functionality that consumes significant processing resources using the above-described truck threads.

Additionally, techniques are disclosed in the above-cited U.S. patent application Ser. No. 16/251,779 for creating an event-driven storage system out of a storage system implementing the above-described always-polling model, through the use of a dedicated peek-poller thread. The dedicated peek-poller thread serves as a mechanism to allow for the sharing of the full resources of the other cores in a processing device between the two or more applications in a manner that dynamically matches the user operation pattern. For example, the dedicated peek-poller thread is executed on a core of the processing device and partially replaces the polling functionality of each of the truck threads executing on the other cores in the processing device, thereby freeing up the processing resources of those other cores that would otherwise be used by the truck threads for polling for use by other applications during times when the block-storage application is experiencing reduced activity.

However, a situation may arise where, for example, the block-storage application is utilizing the full resources of the processing cores 210 such that having a dedicated peek-poller thread executing on one of the cores 210 reduces the total amount of processing resources available to the block-storage application. For example, if there are ten cores available on the processing device 108-$i$, and one of the cores is executing a dedicated peek-poller thread, only nine of the cores or 90% of the processing resources of the processing device are available for use by the block-storage application.

U.S. patent application Ser. No. 16/251,868, filed Jan. 18, 2019, now issued as U.S. Pat. No. 10,884,799, and entitled "Multi-Core Processor in Storage System Executing Dynamic Thread for Increased Core Availability," also incorporated by reference herein in its entirety, discloses in illustrative embodiments dynamic truck threads that may be executed on the cores of a processing device. The function of each of the dynamic truck threads is modifiable between multiple operating modes such that the full processing resources of the all of the cores of a processing device are available for use by a block-storage application during periods of time when the block-storage application is exhibiting high levels of core utilization while the processing resources of the cores are also available for other applications during periods of time when the block-storage application is exhibiting moderate to low levels of core utilization.

For example, in such embodiments, the function of a given dynamic truck thread is dynamically modifiable between an operating mode where the given dynamic truck thread performs the above-described truck thread functionality and an operating mode where the given dynamic truck thread performs at least some of the above-described peek-poller thread functionality. In some embodiments, the functionality of each of the dynamic truck threads may also be modified to an operating mode where all functions of the dynamic truck threads are disabled on the cores 210 of the processing device 108-$i$ such that the processing resources of the cores 210 are fully available for use by other applications, such as a file-storage application.

Illustrative embodiments disclosed herein can utilize one or more of the techniques disclosed in the above-cited U.S. patent application Ser. Nos. 16/251,779 and 16/251,868. For example, one or more of the truck threads 224 of FIG. 2 may be implemented as respective dynamic truck threads. However, it is to be appreciated that utilization of such techniques is not required in illustrative embodiments disclosed herein.

The processing cores 210 of the FIG. 2 embodiment can therefore execute threads of multiple applications, including truck threads 224 and other application threads 226. For example, in some embodiments, a block-storage application is implemented by executing truck threads 224 on respective ones of the cores 210, with each of the truck threads 224 implementing a corresponding portion of the block-storage application. As described above, by executing truck threads 224 on respective cores 210, a significant portion of the processing resources of each of the cores 210 is utilized for polling interfaces associated with its corresponding truck thread, and processing associated tasks, events or other data found on those interfaces, leaving little to no processing resources available on that core for executing the threads of other applications. Some embodiments address this issue through the use of dynamic truck threads executing on one or more of the processing cores 210.

As indicated previously, performance monitoring techniques are typically used in a storage system to monitor the performance of core threads, such as the truck threads 224 executing on respective ones of the processing cores 210. Conventional performance monitoring techniques are problematic in that they can generate inaccurate measurements when a given processing core is used to execute multiple threads of different applications, such as the above-noted block-storage application and file-storage application.

The storage system 105 is advantageously configured to avoid these and other drawbacks of conventional storage systems by providing enhanced performance monitoring techniques that can generate significantly more accurate measurements in situations in which a given processing core of a storage system is used to execute multiple threads of different applications. For example, some embodiments are advantageously configured to generate highly accurate performance measurements for respective sub-threads of a given thread of a primary storage application executing on a processing core, even in situations in which that thread is repeatedly suspended in order to allow one or more threads of one or more other applications to execute on the same processing core.

In some embodiments, the processing device 108-$i$ of the storage system 105 is configured to implement performance monitoring functionality for core threads of the storage system 105, such as the truck threads 224 that include respective internal schedulers 230 and respective external schedulers 232. Each of the other processing devices 108 is assumed to be similarly configured. This core thread performance monitoring functionality of the processing device 108-$i$ will now be described in more detail.

In operation, the performance monitor 218 is configured to monitor performance of threads executing on the processing cores 210, such as truck threads 224 and other application threads 226. Such performance monitoring in illustrative embodiments involves collecting performance measurements from respective ones of the core threads.

For example, in the FIG. 2 embodiment, the truck thread 224-1 is assumed to be part of a block-storage application executing on the processing core 210-1. The truck thread 224-1 comprises internal scheduler 230-1, illustratively configured to control switching between particular ones of the X-threads 225-1 of the truck thread 224-1, and external scheduler 232-1, illustratively configured to control release of the processing core 210-1 by the truck thread 224-1 for use by at least one of the other application threads 226-1 of a second application different than the block-storage application. In some embodiments, the second application comprises a file-storage application, although references herein to block-storage applications and file-storage applications are considered non-limiting examples. It will be assumed for description of illustrative embodiments below that the second application comprises a file-storage application that executes using one or more of the other application threads 226 on one or more of the processing cores 210.

In conjunction with monitoring the performance of the truck thread 224-1 in executing the block-storage application, a cumulative suspend time of the truck thread 224-1 is maintained over multiple suspensions of the truck thread 224-1, where one or more of the multiple suspensions allow at least the other application thread 226-1 of the file-storage application to execute on the processing core 210-1, and performance measurements are generated for respective ones of the X-threads 225-1 of the truck thread 224-1 based at least in part on the cumulative suspend time of the truck thread 224-1. Such operations are performed at least in part by the external scheduler 232-1 of the truck thread 224-1.

The performance monitor 218 illustratively gathers such performance measurements from the truck thread 224-1 and from other ones of the truck threads 224 executing on respective other ones of the cores 210, and provides such measurements to the system manager 216 for use in controlling configuration of the processing device 108-$i$ and its processing cores 210 and their associated threads 224 and 226. As mentioned previously, the truck thread 224-1 when executing on the processing core 210-1 is illustratively configured to utilize substantially all available processing resources of the processing core 210-1, such as 90% or more of the available processing resources of that core. Other embodiments can combine at least portions of system manager 216 and performance monitor 218 into a single component implemented on one or more processing cores 210 of at least one of the processing devices 108.

As indicated above, the truck threads 224 run respective sets of X-threads 225. The X-threads 225 illustratively comprise respective lightweight threads that are scheduled by the internal schedulers 230 of the respective truck threads 224. For example, there may be thousands of X-threads 225 associated with each of the truck threads 224. The X-threads 225 in some embodiments are non-preemptive (e.g., cooperative), which means that one of the X-threads of a particular truck thread voluntarily gives up execution in order to allow another one of the X-threads of that truck thread to be scheduled. If an X-thread is doing a lengthy computational task (e.g., a task taking tens of microseconds), it should contain explicit yield and/or suspension calls, or implicit calls by waiting on synchronization objects.

It is assumed in some embodiments herein that each X-thread can be in one of multiple designated states at a particular point in time, including, for example, a running state, a ready state and a suspended state. In the running state, the X-thread is currently running. In the suspended state, the X-thread is waiting on a synchronization object (e.g., a semaphore, timer, etc.) In the ready state, the X-thread is ready to run, but waiting for the processing core (e.g., another X-thread is currently running).

The X-threads 225-1 are examples of what are more generally referred to herein as "sub-threads" of their corresponding truck thread 224-1. Other types of sub-threads having different arrangements of possible states can be used in other embodiments.

The X-threads 225-1 in some embodiments therefore comprise respective non-preemptive threads and the truck thread 224-1 is configured such that no X-thread in the running state is suspended to allow release of the processing core 210-1 by the truck thread 224-1 for use by the other application thread 226-1. The above-noted multiple suspensions of the truck thread 224-1 to allow the other application thread 226-1 to execute therefore each occur in conjunction with a switch between X-threads 225-1 of the truck thread 224-1. As mentioned previously, the scheduling of the X-threads 225-1 is illustratively performed under the control of the internal scheduler 230-1 of the truck thread 224-1.

In some embodiments, the external scheduler 232-1 of the truck thread 224-1 comprises a processing core release component and a waker component. The processing core release component is configured to determine, in conjunction with each switch between X-threads 225-1 of the truck thread 224-1, whether or not the truck thread 224-1 will suspend itself so as to release the processing core 210-1 for use by at least another application thread 226-1 of the file-storage application. The processing core release component in some embodiments may be referred to as a CPU release component, as the processing cores such as cores 210 may comprise respective distinct CPUs of the processing device 108-i.

In some embodiments, the processing core release component of the truck thread 224-1 more particularly operates as follows. On every X-thread switch, a determination is made as to whether or not the truck thread 224-1 will give up execution, to allow other applications (e.g., a file-storage application) to run. When a truck thread suspends itself, it will resume execution when no other application is ready to run, or it will be rescheduled to run after a certain time by the waker component, whichever happens first.

The waker component is configured to determine, in conjunction with each switch between X-threads 225-1 of the truck thread 224-1, whether or not there is at least one additional thread of the block-storage application to be returned from suspension prior to release of the processing core 210-1 by the truck thread 224-1.

The waker component in some embodiments more particularly operates as follows. On every X-thread switch, and before the decision is made whether to give up the processing core, the waker component checks if there are currently one or more other truck threads of the block-storage application that are suspended and need to be awakened, and if so it wakes up the one or more other truck threads.

The processing core release component therefore illustratively operates in conjunction with the waker component to suspend the truck thread 224-1 and to return the truck thread 224-1 from suspension. Other arrangements of additional or alternative components can be included in the external scheduler 232-1 in other embodiments.

Example sets of pseudocode for implementing at least a portions of the internal scheduler 230-1 and the external scheduler 232-1 of the truck thread 224-1 will be described below in conjunction with FIG. 4.

In some embodiments, generating performance measurements for respective ones of the X-threads 225-1 of the truck thread 224-1 based at least in part on the cumulative suspend time of the truck thread 224-1 comprises generating a ready time measurement for a particular one of the X-threads 225-1, and adjusting the ready time measurement based at least in part on the cumulative suspend time of the truck thread 224-1. The adjusted ready time measurement is indicative of an amount of time the particular X-thread spent in the ready state while the truck thread 224-1 was not suspended.

Additionally or alternatively, generating performance measurements for respective ones of the X-threads 225-1 of the truck thread 224-1 based at least in part on the cumulative suspend time of the truck thread 224-1 comprises generating a suspend time measurement for a particular one of the X-threads 225-1, and adjusting the suspend time measurement based at least in part on the cumulative suspend time of the truck thread 224-1. The adjusted suspend time measurement is indicative of an amount of time the particular X-thread spent in the suspended state while the truck thread 224-1 was not suspended.

The above-noted ready time measurement and suspend time measurement are examples of "performance measurements" that are generated for respective ones of the X-threads 225-1 of the truck thread 224-1 based at least in part on the cumulative suspend time of the truck thread 224-1.

A wide variety of other types of performance measurements can be generated in other embodiments, and the term "performance measurement" as used herein is therefore intended to be broadly construed. Such performance measurements are illustratively collected from the truck thread 224-1 and the other truck threads 224 by the performance monitor 218, and utilized by system manager 216 in controlling configuration of one or more of the processing cores 210 of the processing device 108-i.

In some embodiments, generation of performance measurements includes logging of performance counters as triggered by scheduling events, such as an X-thread state changing from the running state, to the suspended state, to the ready state. For example, the performance monitor 218 can collect time "counters" or other time measurements per flow that measure various aspects of the flow operation, where a given flow in this context illustratively corresponds to an X-thread. Performance measurements that can be made include the above-noted ready time measurement and suspend time measurement. The ready time measurement illustratively measures the amount of time a given flow was ready to run, but waiting for the core, and corresponds to the amount of time its X-thread was in the ready state. Similarly, the suspend time measurement illustratively measures the amount of time the given flow was waiting on some synchronization object, and corresponds to the amount of time its X-thread was in the suspended state. The corresponding time intervals for the suspend time measurement are illustratively collected for each synchronization object that the given flow was waiting on during its execution. Other performance measurements include running time measurements, which measure the actual runtime of the given flow, and corresponds to the amount of time that its X-thread was in the running state.

Illustrative embodiments herein recognize that the ready time and suspend time measurements made for particular X-threads can be adversely impacted by not properly measuring amounts of time that the corresponding truck thread was suspended to allow for execution of other application threads on the same core. For example, during the ready time and suspend time intervals described above, the truck thread 224-1 executing the block-storage application may be suspended multiple times, leading to false measurements of these types of intervals. More particularly, if during the time a flow of an X-thread is in the ready state and the truck thread 224-1 decides to perform a context switch so as to release the core for use by one or more other applications, the time spent by the other application(s) will be added to the measurement, which is time outside the context of the block-storage application, and therefore will not accurately reflect the internal ready or suspend time, and may instead provide a significantly longer duration. Illustrative embodiments herein overcome such issues by maintaining a cumulative suspend time for the truck thread 224-1, and generating performance measurements for a given one of the X-threads 225-1 of that truck thread 224-1, such as the above-noted ready time and suspend time measurements, in an efficient manner that properly accounts for the amount of time that the truck thread 224-1 is suspended.

It should be noted in this regard that the running time measurement of an X-thread is not similarly impacted by suspend time of its truck thread, as the external scheduler of the truck thread in illustrative embodiments does not preempt X-threads, but instead suspends the truck thread only in conjunction with a switch between X-threads.

Additional performance monitoring functionality implemented in storage system 105 in some embodiments includes aspects of performance monitoring as disclosed in U.S. Pat. No. 10,152,232, entitled "Low-Impact Application-Level Performance Monitoring with Minimal and Automatically Upgradable Instrumentation in a Storage System," which is incorporated by reference herein in its entirety.

For example, U.S. Pat. No. 10,152,232 describes techniques for monitoring of storage system processing time dynamics at a flow level, in order to generate performance measurements that can be used for various purposes such as for the investigation and debugging of issues as well as for performance analysis of the storage system.

However, other performance monitoring techniques can be implemented in other embodiments, and illustrative embodiments should therefore not be viewed as being limited to use with any particular performance monitoring techniques, such as those disclosed in U.S. Pat. No. 10,152,232.

In some embodiments, maintaining a cumulative suspend time of the truck thread 224-1 over multiple suspensions of the truck thread 224-1 comprises, for each of the multiple suspensions of the truck thread 224-1, taking a first timestamp to indicate start of the suspension, taking a second timestamp to indicate resumption of the truck thread 224-1 from the suspension, and adding a time interval corresponding to a difference between the first and second timestamps to the cumulative suspend time.

Additionally or alternatively, maintaining a cumulative suspend time of the truck thread 224-1 over multiple suspensions of the truck thread 224-1 comprises, for each of the multiple suspensions of the truck thread 224-1, storing a current value of the cumulative suspend time in association with a current value of a suspension number counter that is incremented with each of the multiple suspensions of the truck thread 224-1.

Such operations are illustratively performed by the external scheduler 232-1 of the truck thread 224-1. For example, these operations can be performed by the processing core release component of the external scheduler 232-1 of the truck thread 224-1.

In some embodiments, generating performance measurements for respective ones of the X-threads 225-1 of the truck thread 224-1 based at least in part on the cumulative suspend time of the truck thread 224-1 comprises taking a first timestamp to indicate start of a performance interval, storing a starting value of the suspension number counter in conjunction with taking the first timestamp, taking a second timestamp to indicate end of the performance interval, storing an ending value of the suspension number counter in conjunction with taking the second timestamp, utilizing the starting and ending values of the suspension number counter to determine respective corresponding values of the cumulative suspend time of the truck thread 224-1, and adjusting a difference between the first and second timestamps based at least in part on a difference between the corresponding values of the cumulative suspend time of the truck thread 224-1. The resulting performance measurement is adjusted to account for an amount of time the particular X-thread spent in the suspended state while the truck thread 224-1 was not suspended. Like other types of performance measurements generated based at least in part on cumulative suspend time of the truck thread 224-1 using the techniques disclosed herein, such a performance measurement is highly accurate.

The disclosed techniques therefore provide significant advantages over conventional approaches in which measurements can be inaccurate due to a failure to properly account for periods of time in which a truck thread is suspended in order to allow threads of one or more other applications to execute on the same processing core.

It is assumed that each of the other truck threads 224 of processing device 108-$i$ operates in the manner described above for truck thread 224-1. It is further assumed that each of the other processing devices 108 of the storage system 105 is configured in a manner similar to that illustrated in FIG. 2 for processing device 108-$i$.

In some embodiments, each of the processing devices 108 incudes its own system manager 216 and performance monitor 218. However, in other embodiments, it is possible that such components are implemented on only one of the processing devices 108, or on other subsets of the processing devices 108, in which case a system manager 216 and performance monitor 218 implemented on one of the processing devices 108 may provide similar system management and performance monitoring functionality for one or more other ones of the processing devices 108. It is therefore possible that one or more of the processing devices 108 may not include its own instances of system manager 216 and/or performance monitor 218. Also, although system manager 216 and performance monitor 218 are illustratively shown as executing on a separate core 210-0 in this embodiment, this is by way of example only, and in other embodiments, one or more of these components may each be distributed over multiple ones of the cores 210.

In some embodiments, storage system 105 may comprise a separate processing device that executes the system manager 216 and manages the truck threads 224 executing on the cores 210 of the processing devices 108 of the nodes 106.

Accordingly, in some embodiments, the execution and implementation of system manager 216 and/or performance monitor 218 may be distributed across multiple cores 210, processing devices 108, and/or nodes 106.

In some embodiments, the system manager 216 and performance monitor 218 collectively monitor the core utilization of one or more of the processing devices 108 and may dynamically control and change the modes in which the truck threads 224 and other application threads 226 operate in order to adapt the storage system 105 to actual usage patterns of the users associated with the host devices 102.

These and other embodiments can utilize various techniques for disabling and re-enabling threads, including those disclosed in U.S. patent application Ser. No. 16/162,471, filed Oct. 17, 2018, now issued as U.S. Pat. No. 10,474,496, and entitled "Dynamic Multitasking for Distributed Storage Systems," which is incorporated by reference herein in its entirety.

The operation of the information processing system 100 will now be described in further detail with reference to the flow diagrams of the illustrative embodiments of FIGS. 3A and 3B. The process as shown in FIG. 3A includes steps 300 through 314 and the process as shown in FIG. 3B includes steps 350 through 362. The processes shown in FIGS. 3A and 3B are suitable for use in system 100 but are more generally applicable to other types of information processing systems in which a storage system is configured to implement core thread performance monitoring functionality of the type disclosed herein.

The steps of FIGS. 3A and 3B are illustratively performed at least in part under the control of one or more processing devices 108 of one or more nodes 106 in storage system 105 of system 100. For example, in some embodiments, the steps of FIGS. 3A and 3B may be performed under the control of system manager 216 executing on processing device 108-$i$ of a corresponding one of the nodes 106 of the storage system 105. Some or all of the steps may be performed asynchronously relative to one another rather than serially as illustrated in the figures. Also, multiple instances of the process can be performed at least in part in parallel to one another for different truck threads or other block-storage threads of different processing cores of processing device 108-$i$. It is further assumed that each of the other processing devices 108 executes similar processes for generating performance measurements based on cumulative suspend times maintained for respective truck threads 224 of their respective processing cores 210.

Referring initially to FIG. 3A, an example process is shown for maintaining a cumulative suspend time for a given truck thread executing on a particular processing core of a processing device of a node of a storage system. The truck thread in this embodiment is also referred to as a block-storage thread, and is assumed to execute a portion of a block-storage application of the storage system on the particular processing core.

In step 300, the block-storage thread and its X-threads execute on a first processing core. For example, the block-storage thread may comprise truck thread 224-1 having X-threads 225-1 executing on processing core 210-1 in the FIG. 2 embodiment.

In step 302, a determination is made as to whether or not the block-storage thread is to be suspended at a particular switch between two of its X-threads. If the block-storage thread will not be suspended at the particular switch between the X-threads, the process moves to step 304, and otherwise moves to step 306.

In step 304, the block-storage thread continues to schedule its X-threads for execution on the first core, and the process returns to step 300 as indicated. The scheduling of X-threads of the block-storage thread is illustratively performed by its internal scheduler, such as internal scheduler 230-1 in truck thread 224-1.

In step 306, which is reached if the block-storage thread is to be suspended in conjunction with the current switch between X-threads, the block-storage thread takes a first timestamp to indicate start of the suspension, and then suspends itself as indicated, after which the process moves to step 308.

In step 308, a file-storage thread is executed on the first core while the block-storage thread is suspended on that core. For example, the file-storage thread may comprise one of the other application threads 226-1 that is executed responsive to suspension of the truck thread 224-1 under the control of its external scheduler 232-1.

In step 310, a determination is made as to whether or not the block-storage thread is to be resumed. Such a determination in the present embodiment is illustratively made by a waker component of another block-storage thread executing on a different one of the processing cores of the same processing device. If the suspended block-storage thread is to be resumed, the process moves to step 312, and otherwise returns to step 308 to continue executing the file-storage thread on the first core.

In step 312, which is reached if the suspended block-storage thread is to be resumed, the waker component of the block-storage thread executing on the different processing core suspends the file-storage thread on the first core, and resumes the previously-suspended block storage thread on the first core. The process then moves to step 314 as indicated.

In step 314, the resumed block-storage thread on the first core takes a second timestamp to indicate the end of its suspension, updates the cumulative suspend time ("CST") using the first and second timestamps that indicate the respective start and end of its suspension, and stores the current CST indexed by a current suspension count. Prior to an initial suspension of the block-storage thread executing on the first core, the CST is illustratively initialized to a particular value, such as zero. The storing of the current CST value indexed by a current suspension count illustratively uses a look-up table or other data structure stored in a memory of the first core on which the resumed block-storage thread is executing. The data structure in some embodiments comprises a plurality of entries, with each such entry comprising a different count value and a corresponding CST value that is indexed by its corresponding count value. The process then returns to step 300 via step 304 as indicated, to continue execution of the now-resumed block-storage thread and its corresponding X-threads on the first core.

Steps 302 through 314 are illustratively repeated for one or more additional suspensions of the block-storage thread on the first core, each illustratively performed in order to allow the file-storage thread to execute during the suspension. Thus, the CST of the block-storage thread in this embodiment is maintained over multiple suspensions of that block-storage thread, each allowing execution of a different thread on the same core. The above-noted suspension count is incremented with each such suspension of the block-storage thread. Different suspension counts are therefore maintained for respective different block-storage threads that are subject to suspension in the storage system. Such incrementing of suspension counts is illustrative performed by respective external schedulers of the block-storage threads. For example, a processing core release component of an external scheduler 232-1 of truck thread 224-1 illustratively performs such incrementing, in conjunction with its updating of the CST using the first and second timestamps in step 314 of FIG. 3A. The CST for a given truck thread can be reinitialized to zero under various conditions, such as termination of that truck thread, possibly occurring in conjunction with a reboot or reconfiguration of the processing device 108-i.

With reference now to FIG. 3B, an example process is shown for generating performance measurements, based at least in part on the cumulative suspend time maintained utilizing the process of FIG. 3A.

In step 350, the block-storage thread and its X-threads execute on the first processing core, as in step 300 of the process of FIG. 3A.

In step 352, a determination is made as to whether or not a performance measurement is to be taken for a given one of the X-threads of the block-storage thread. If a performance measurement will not be taken for the given X-thread, the process moves to step 354, and otherwise moves to step 356.

In step 354, the block-storage thread continues to schedule its X-threads for execution on the first core, and the process returns to step 350 as indicated. Again, the scheduling of X-threads of the block-storage thread is illustratively performed by its internal scheduler, such as internal scheduler 230-1 in truck thread 224-1.

In step 356, a first timestamp is taken to indicate the start of a performance interval and stored with a starting value of the suspension count. The performance interval is a period of time for which a performance measurement is to be taken.

In step 358, a second timestamp is taken to indicate the end of the performance interval and stored with an ending value of the suspension count. It should be noted that the first and second timestamps referred to in respective steps 356 and 358 in the context of a performance interval for generating a performance measurement in FIG. 3B are distinct from the first and second timestamps used to denote start and end of a given suspension of a block-storage thread in FIG. 3A.

In step 360, the starting and ending values of the suspension count are utilized to look up respective corresponding CST values in the data structure referred to in the context of step 314 of the process of FIG. 3A.

In step 362, an adjusted interval duration is computed for the performance measurement by subtracting, from a difference of the first and second timestamps, the difference between the CST values determined in step 360. In this manner, a performance measurement can be generated for a given X-thread of the block-storage thread executing on the first core based at least in part on the CST of the block-storage thread. The process then returns to step 350 as indicated. In other embodiments, the return could be via step 354.

Steps 352 through 362 are illustratively repeated to generate performance measurements for one or more other X-threads of the block-storage thread. Such measurements can be performed at least in part by the external scheduler 232-1 of truck thread 224-1, and more particularly at least in part by a processing core release component of the external scheduler 232-1, although numerous other arrangements are possible.

Functionality such as that described in conjunction with the flow diagrams of FIGS. 3A and 3B can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller comprising at least a portion of each of one or more of the processing devices 108 of storage system 105 and configured to control performance of one or more steps of the processes of FIGS. 3A and 3B in system 100 can be implemented as part of what is more generally referred to herein as a processing platform comprising one or more processing devices each comprising a processor coupled to a memory. A given such storage controller may correspond to one or more virtual machines or other types of virtualization infrastructure such as Docker containers or Linux containers (LXCs). The storage controller, as well as other system components, may be implemented at least in part using processing devices of such processing platforms. For example, in a distributed implementation, respective distributed modules of such a storage system 105 can be implemented in respective containers running on respective ones of the processing devices of a processing platform.

Additional illustrative embodiments implementing core thread performance monitoring functionality will now be described with reference to FIGS. 4 and 5.

Referring now to FIG. 4, two different example sets of pseudocode 400 and 402 are shown, and are associated with respective internal and external schedulers of a core thread. For example, the pseudocode 400 is illustratively part of an internal scheduler 230-1 of truck thread 224-1, and controls switch points between X-threads 225-1. More particularly, pseudocode 400 is illustratively executed at a given switch point between two of the X-threads 225-1, and initially triggers a cycle of the external scheduler 232-1, prior to determining the next X-thread to execute and scheduling execution of that X-thread.

Pseudocode 402 is illustratively part of the external scheduler 232-1 of truck thread 224-1, and implements the external scheduler cycle triggered by the pseudocode 400 at the switch point between the X-threads of the truck thread 224-1. In this example external scheduler cycle, a processing core release component of the external scheduler 232-1, more particularly referred to as a CPU release component, determines if the CPU should be released, and if so takes a first timestamp indicative of the start of the suspension, and suspends the truck thread 224-1 by releasing the CPU. After the truck thread 224-1 is resumed, the external scheduler cycle takes a second timestamp to indicate the end of the suspension, updates the CST using the first and second timestamps, and stores the current CST indexed by the current suspension count. It also increments the suspension count as shown, although it is to be appreciated that other suspension count maintenance arrangements can be used in other embodiments. For example, the incrementing of the suspension count can occur at a different point in the external scheduler cycle than that shown in FIG. 4.

Figure 5:
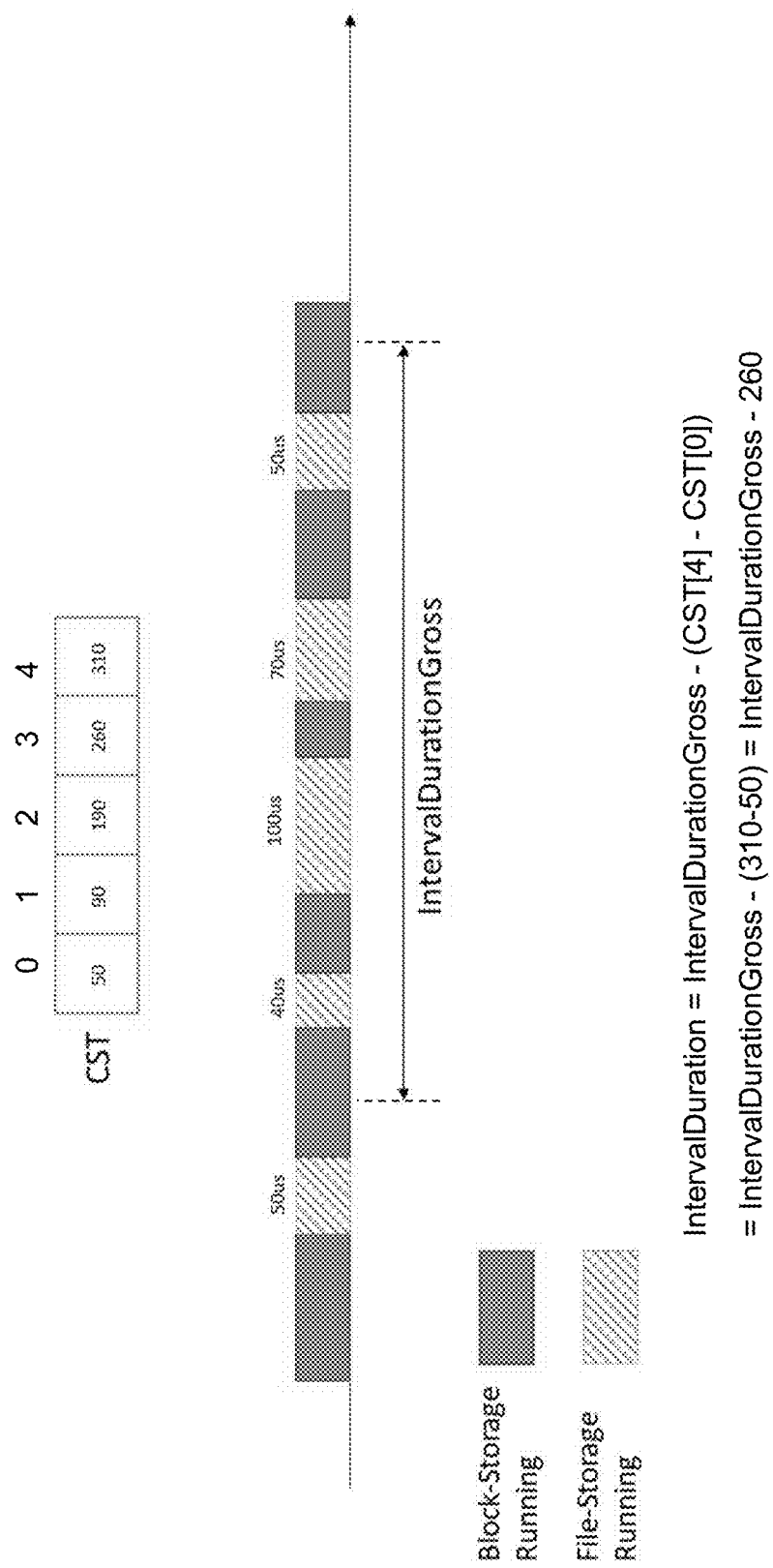
FIG. 5 shows a performance monitoring example involving block-storage and file-storage applications running on a processing core in an illustrative embodiment.

Turning now to FIG. 5, a performance monitoring example involving block-storage and file-storage applications running on a processing core is shown. The top portion of the figure illustrates the cumulative suspend time or CST for this example, as maintained in the manner described above, over multiple suspensions of a block-storage thread on a given processing core to allow a file-storage thread to execute on that same core. The remaining portion of the figure includes a timeline that shows the suspensions of the block-storage thread, illustratively five suspensions for respective durations of 50 microseconds ("us"), 40 us, 100 us, 70 us and 50 us. The CST that is illustratively maintained by an external scheduler of the block-storage thread over these multiple suspensions of the block-storage thread thus increases from an initial suspension duration of 50 us, to 50 us+40 us=90 us, to 90 us+100 us=190 us, to 190 us+70 us=260 us, and finally to 260 us+50 us=310 us, as illustrated. The CST is assumed to be initialized to zero at some point prior to the first suspension of the block-storage thread, and as indicated previously herein may eventually be reinitialized to zero under certain conditions.

In the present embodiment, the CST of the block-storage thread is saved each time that the block-storage thread resumes after a previous suspension. For example, when the external scheduler decides to release the processing core, it will take a timestamp (T1) to indicate the start of the suspension, and when the block-storage thread resumes, it will take another timestamp (T2), add the interval T2-T1 to the CST, and save the updated CST. The external scheduler also stores the current number of suspensions (denoted "NumSuspends"). The CST values that are saved for every suspend event are indexed by the corresponding values of the suspension count, for example, in a look-up table or other data structure. In addition, whenever an X-thread performance monitoring component takes starting and ending timestamps (denoted "StartTimestamp" and "EndTimestamp") of an interval it wants to measure, that component will also save the respective corresponding current values of NumSuspends (denoted "StartNumSuspends" and "EndNumSuspends"). When the interval finishes, the correct time duration can be obtained by the following low-complexity calculation, which computes an actual interval duration (denoted "IntervalDuration") from a gross measurement of the interval duration (denoted "IntervalDurationGross"):

IntervalDuration=IntervalDurationGross−(CST[EndNumSuspends]−CST[StartNumSuspends])

where:
CST[EndNumSuspends]=CST value after EndNumSuspends, and
CST[StartNumSuspends]=CST value after StartNumSuspends.

With reference again to the example in the figure, it can be seen that the gross measurement for the gross interval duration indicated by the length of the horizontal arrow is adjusted to subtract therefrom the amount of CST accumulated over the second to fifth suspensions, denoted in the figure as CST[4]−CST[0]=310 us-50 us=260 us.

The FIG. 5 embodiment and other illustrative embodiments herein provide a mechanism that enables accurate measurements of time intervals of flows of a storage system, taking into account context switches and run time of other applications.

More particularly, in the FIG. 5 embodiment, the storage system is configured to maintain information about the time durations of respective multiple suspensions of the truck thread, in a way that permits calculation of the relevant suspend durations that occurred during every interval measured by an X-thread performance monitoring mechanism. These durations can be subtracted from a gross measurement of the desired interval, in order to obtain the correct value of the interval duration. Such measured time intervals are examples of what are more generally referred to herein as "performance measures." It is to be appreciated that the particular features of FIGS. 4 and 5, and those of other illustrative embodiments, are presented by way of example only, and should not be construed as limiting in any way.

In some embodiments, a storage system comprises a distributed content addressable storage (CAS) system configured to support performance monitoring functionality for core threads having internal and external schedulers as disclosed herein. A distributed CAS system is also referred to herein as a clustered CAS system. A "distributed CAS system" as that term is broadly used herein includes any CAS system that is distributed across multiple storage nodes, such as the nodes 106 of storage system 105.

An illustrative embodiment of such a CAS system will now be described with reference to FIG. 6. In this embodiment, a CAS system 605 comprises a plurality of storage devices 606 and an associated storage controller 608. The CAS system 605 may be viewed as a particular implementation of the storage system 105, and accordingly is assumed to be coupled to host devices 102 via network 104 in system 100.

The storage controller 608 in the present embodiment is configured to support storage system core thread performance monitoring functionality of the type previously described in conjunction with FIGS. 1 through 5. For example, the CAS system 605 illustratively interacts with one or more host devices 102 to support performance of a process such as that shown in FIG. 3, in order to implement performance monitoring functionality for core threads executing in the CAS system 605.

The storage controller 608 includes distributed modules 616 and 618, which are configured to operate in a manner similar to that described above for respective system manager 216 and performance monitor 218 of the processing device 108-*i* of system 100. Module 616 is more particularly referred to as distributed system management logic, and illustratively comprises multiple system management logic instances on respective ones of a plurality of distinct nodes, with the multiple system management logic instances collectively supporting core thread performance monitoring functionality as disclosed herein. Module 618 more particularly comprises distributed performance monitoring logic with different instances thereof also being implemented on respective ones of the distinct nodes.

Figure 6:
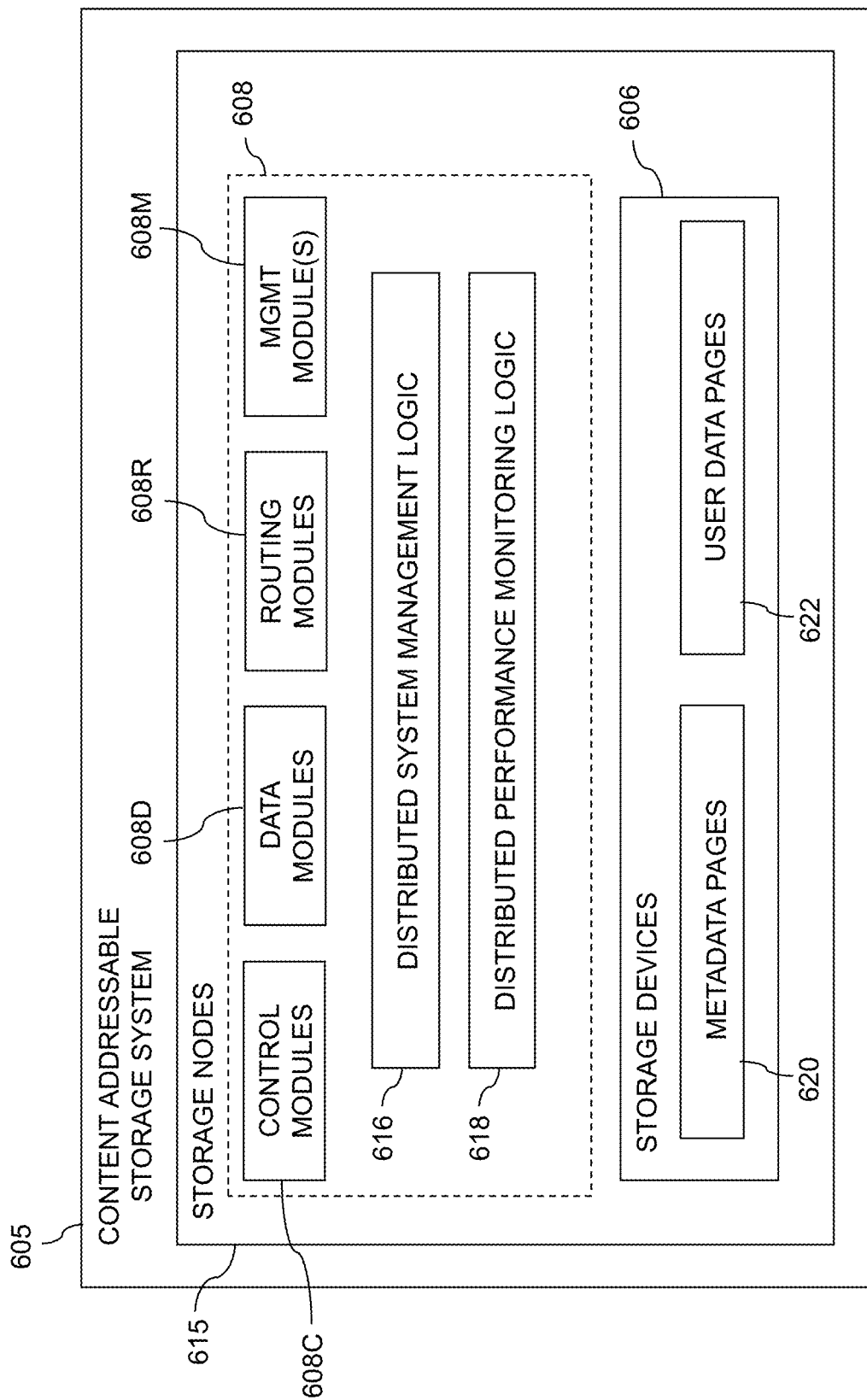
FIG. 6 shows a content addressable storage system having a distributed storage controller configured for implementing performance monitoring functionality for a core thread with internal and external schedulers in an illustrative embodiment.

The CAS system 605 in the FIG. 6 embodiment is implemented as a distributed storage system and illustratively includes a plurality of storage nodes 615 each comprising a corresponding subset of the storage devices 606. Such storage nodes 615 are examples of the "distinct nodes" referred to above, and other distributed or clustered storage system arrangements comprising multiple storage nodes and possibly additional or alternative nodes can be used in other embodiments. A given distributed or clustered storage system may therefore include not only storage nodes 615 but also additional storage nodes, compute nodes or other types of nodes coupled to network 104. Alternatively, such additional storage nodes may be part of another distributed or clustered storage system of the system 100. Each of the storage nodes 615 of the CAS system 605 is assumed to be implemented using at least one processing device comprising a processor coupled to a memory.

The storage controller 608 of the CAS system 605 is implemented in a distributed manner so as to comprise a plurality of distributed storage controller components implemented on respective ones of the storage nodes 615. The storage controller 608 is therefore an example of what is more generally referred to herein as a "distributed storage controller." In subsequent description herein, the storage controller 608 is referred to as distributed storage controller 608.

Each of the storage nodes 615 in this embodiment further comprises a set of processing modules configured to communicate over one or more networks with corresponding sets of processing modules on other ones of the storage nodes 615. The sets of processing modules of the storage nodes 615 collectively comprise at least a portion of the distributed storage controller 608 of the CAS system 605.

The modules of the distributed storage controller 608 in the present embodiment more particularly comprise different sets of processing modules implemented on each of the storage nodes 615. The set of processing modules of each of the storage nodes 615 comprises at least a control module 608C, a data module 608D and a routing module 608R. The distributed storage controller 608 further comprises one or more management ("MGMT") modules 608M. For example, only a single one of the storage nodes 615 may include a management module 608M. It is also possible that management modules 608M may be implemented on each of at least a subset of the storage nodes 615. A given set of processing modules implemented on a particular one of the storage nodes 615 therefore illustratively includes at least one control module 608C, at least one data module 608D and at least one routing module 608R, and possibly a management module 608M.

Communication links may be established between the various processing modules of the distributed storage controller 608 using well-known communication protocols such as TCP/IP and RDMA. For example, respective sets of IP links used in data transfer and corresponding messaging could be associated with respective different ones of the routing modules 608R.

Although shown as separate modules of the distributed storage controller 608, the modules 616 and 618 in the present embodiment are assumed to be distributed at least in part over at least a subset of the other modules 608C, 608D, 608R and 608M of the storage controller 608.

Accordingly, at least portions of the storage system core thread performance monitoring functionality of the modules 616 and 618 may be implemented in one or more of the other modules of the storage controller 608. In other embodiments, the modules 616 and 618 may be implemented as stand-alone modules of the storage controller 608.

The storage devices 606 are configured to store metadata pages 620 and user data pages 622, and may also store additional information not explicitly shown such as checkpoints and write journals. The metadata pages 620 and the user data pages 622 are illustratively stored in respective designated metadata and user data areas of the storage devices 606. Accordingly, metadata pages 620 and user data pages 622 may be viewed as corresponding to respective designated metadata and user data areas of the storage devices 606.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 620 and the user data pages 622.

The user data pages 622 are part of a plurality of LUNs configured to store files, blocks, objects or other arrangements of data, each also generally referred to herein as a "data item," on behalf of users of the CAS system 605. Each such LUN may comprise particular ones of the above-noted pages of the user data area. The user data stored in the user data pages 622 can include any type of user data that may be utilized in the system 100. The term "user data" herein is therefore also intended to be broadly construed.

A given storage volume for which content-based signatures are generated in the CAS system 605 illustratively comprises a set of one or more LUNs, each including multiple ones of the user data pages 622 stored in storage devices 606.

The CAS system 605 in the embodiment of FIG. 6 is configured to generate hash metadata providing a mapping between content-based digests of respective ones of the user data pages 622 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 622. The hash metadata generated by the CAS system 605 is illustratively stored as metadata pages 620 in the metadata area. The generation and storage of the hash metadata is assumed to be performed under the control of the storage controller 608.

Each of the metadata pages 620 characterizes a plurality of the user data pages 622. For example, in a given set of n user data pages representing a portion of the user data pages 622, each of the user data pages is characterized by a LUN identifier, an offset and a content-based signature. The content-based signature is generated as a hash function of content of the corresponding user data page. Illustrative hash functions that may be used to generate the content-based signature include the well-known SHA1 secure hashing algorithm, or other secure hashing algorithms known to those skilled in the art, including SHA2, SHA256 and many others. The content-based signature is utilized to determine the location of the corresponding user data page within the user data area of the storage devices 606.

Each of the metadata pages 620 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 620 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 605 is illustratively distributed among the control modules 608C.

The storage system core thread performance monitoring functionality provided at least in part by modules 616 and 618 in this embodiment is assumed to be distributed across multiple distributed processing modules, including at least a subset of the processing modules 608C, 608D, 608R and 608M of the distributed storage controller 608.

For example, the management module 608M of the storage controller 608 may include a system management logic instance that engages corresponding system management logic instances in all of the control modules 608C and routing modules 608R in order to support storage system core thread performance monitoring functionality of the CAS system 605.

In some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The distributed storage controller 608 in this example is configured to group consecutive pages into page groups, to arrange the page groups into slices, and to assign the slices to different ones of the control modules 608C. For example, if there are 1024 slices distributed evenly across the control modules 608C, and there are a total of 16 control modules in a given implementation, each of the control modules "owns" 1024/16=64 slices. In such arrangements, different ones of the slices are assigned to different ones of the control modules 608C such that control of the slices within the storage controller 608 of the CAS system 605 is substantially evenly distributed over the control modules 608C of the distributed storage controller 608.

The data modules 608D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 608C but are accessed using the data modules 608D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 605 each illustratively comprise one or more IO operations directing that at least one data item of the CAS system 605 be written to in a particular manner. A given write request is illustratively received in the CAS system 605 from a host device over a network. In some embodiments, a write request is received in the distributed storage controller 608 of the CAS system 605, and directed from one processing module to another processing module of the distributed storage controller 608. For example, a received write request may be directed from a routing module 608R of the distributed storage controller 608 to a particular control module 608C of the distributed storage controller 608. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 608C, data modules 608D and routing modules 608R of the storage nodes 615 communicate with one another over a high-speed internal network such as an InfiniBand network. The control modules 608C, data modules 608D and routing modules 608R coordinate with one another to accomplish various IO processing tasks.

The write requests from the host devices identify particular data pages to be written in the CAS system 605 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The processing modules of distributed storage controller 608 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments. For example, other types of hash-to-physical ("H2P") mapping tables may be used in addition to or in place of the above-noted HMD and PLB tables.

In some embodiments, certain ones of the above-described mapping tables are maintained by particular modules of distributed storage controller 608. For example, the mapping tables maintained by the control modules 608C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The CAS system 605 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the CAS system 605. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 606. This is also referred to as physical layer mapping.

Examples of these and other metadata structures utilized in illustrative embodiments were described above. These particular examples illustratively include respective A2H, H2D, HMD and PLB tables. In some embodiments, the A2H and H2D tables are utilized primarily by the control modules 608C, while the HMD and PLB tables are utilized primarily by the data modules 608D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 605. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 605 correspond to respective physical blocks of a physical layer of the CAS system 605. The user data pages of the logical layer are organized by LBA and have reference via respective content-based signatures to particular physical blocks of the physical layer.

Each of the physical blocks has an associated reference count that is maintained within the CAS system 605. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 608C, 608D, 608R and 608M as shown in the FIG. 6 embodiment is presented by way of example only. Numerous alternative arrangements of processing modules of a distributed storage controller may be used to implement performance monitoring functionality for core threads of a distributed storage system in other embodiments.

Additional examples of content addressable storage functionality implemented in some embodiments by control modules 608C, data modules 608D, routing modules 608R and management module(s) 608M of distributed storage controller 608 can be found in U.S. Pat. No. 9,104,326, entitled "Scalable Block Data Storage Using Content Addressing," which is incorporated by reference herein. Alternative arrangements of these and other storage node processing modules of a distributed storage controller in a CAS system can be used in other embodiments.

Illustrative embodiments of a storage system with performance monitoring functionality for storage system core threads with internal and external schedulers as disclosed herein can provide a number of significant advantages relative to conventional arrangements.

For example, illustrative embodiments disclosed herein are advantageously configured to provide substantially improved performance measurement accuracy in situations in which a given processing core of a storage system is used to execute multiple threads of respective different applications.

More particularly, some embodiments are configured to generate highly accurate performance measurements for respective sub-threads of a given thread of a primary storage application executing on a processing core, even in situations in which that thread is repeatedly suspended in order to allow one or more threads of one or more other applications to execute on the same processing core.

These and other embodiments thereby avoid the inaccurate measurements and other drawbacks of conventional core thread performance monitoring approaches, which have difficulty in situations where a given processing core is used to execute multiple threads of different applications.

Moreover, storage system core thread performance monitoring functionality in illustrative embodiments herein does not adversely impact the performance of the storage system in handling IO requests.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and/or storage systems incorporating performance monitoring functionality for core threads with internal and external schedulers will now be described in greater detail with reference to FIGS. 7 and 8.

Although described in the context of information processing system 100, these processing platforms may also be used to implement at least portions of other information processing systems in other embodiments.

Figure 7:
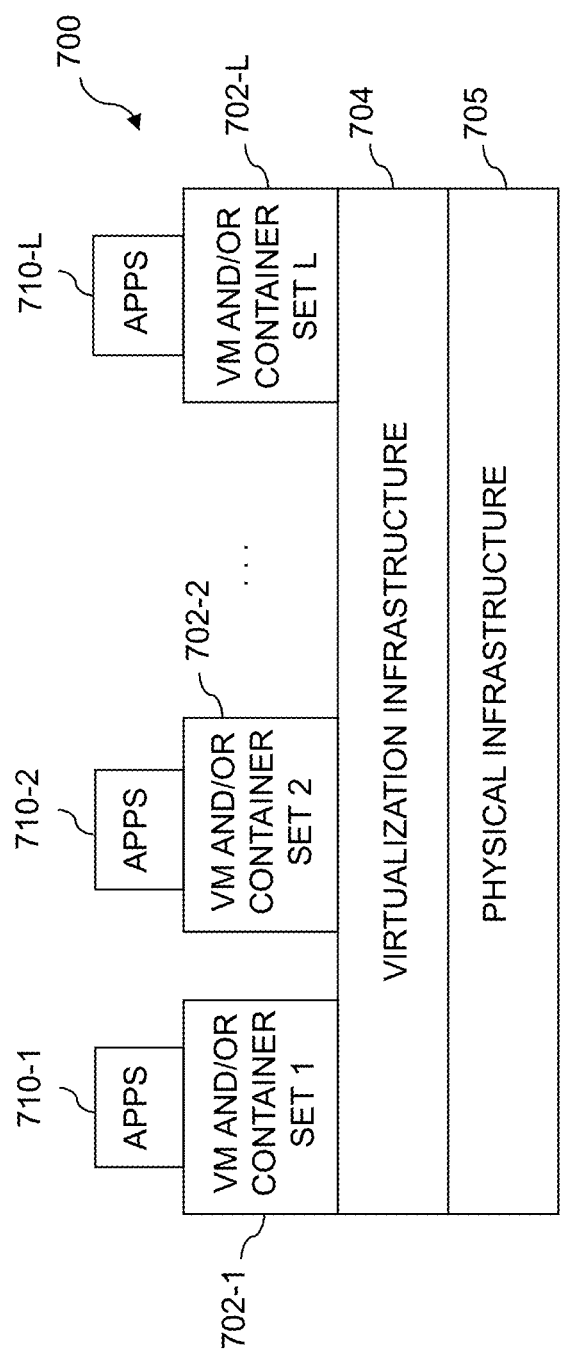

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide performance monitoring functionality for core threads of a storage system of the type described above using one or more processes running on a given one of the VMs. For example, each of the VMs can implement one or more system management logic instances and/or performance monitoring logic instances for supporting the above-described performance management functionality for core threads with internal and external schedulers in the storage system 105 of system 100.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide performance monitoring functionality for core threads of a storage system of the type described above. For example, a container host device supporting multiple containers of one or more container sets can implement one or more system management logic instances and/or performance monitoring logic instances for supporting the above-described performance management functionality for core threads with internal and external schedulers in the storage system 105 of system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, ... 802-K, which communicate with one another over a network 804.

The network 804 may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

The processing device 802-1 in the processing platform 800 comprises a processor 810 coupled to a memory 812.

The processor 810 may comprise a single-core or multi-core CPU, a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the performance monitoring functionality for storage system core threads with internal and external schedulers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, processing cores, threads, internal and external schedulers, applications, system management logic instances, performance monitoring logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least processing device being configured:
to monitor performance of a first thread of a first application executing on one of a plurality of processing cores of a storage system;
the first thread comprising an internal scheduler configured to control switching between a plurality of sub-threads of the first thread, and an external scheduler configured to control release of the processing core by the first thread for use by at least a second thread of a second application different than the first application;
in conjunction with monitoring the performance of the first thread in executing the first application, to maintain a cumulative suspend time of the first thread over multiple suspensions of the first thread, one or more of the multiple suspensions allowing at least the second thread of the second application to execute on the processing core; and
to generate performance measurements for respective ones of the sub-threads of the first thread based at least in part on the cumulative suspend time of the first thread.

2. The apparatus of claim 1 wherein said at least one processing device comprises at least a subset of the plurality of processing cores of the storage system.

3. The apparatus of claim 1 wherein the first application comprises a block-storage application of the storage system.

4. The apparatus of claim 1 wherein the second application comprises a file-storage application of the storage system.

5. The apparatus of claim 1 wherein the first thread comprises a truck thread that when executing on the processing core is configured to utilize substantially all available processing resources of the processing core.

6. The apparatus of claim 1 wherein the external scheduler of the first thread comprises:

a processing core release component configured to determine, in conjunction with each switch between sub-threads of the first thread, whether or not the first thread will suspend itself so as to release the processing core for use by at least the second thread of the second application; and a waker component configured to determine, in conjunction with each switch between sub-threads of the first thread, whether or not there is at least one additional thread of the first application to be returned from suspension prior to release of the processing core by the first thread;

the processing core release component further operating in conjunction with the waker component to return the first thread from suspension.

7. The apparatus of claim 1 wherein each of the sub-threads of the first thread is in one of multiple designated states at a particular point in time, including a running state, a ready state and a suspended state.

8. The apparatus of claim 7 wherein the sub-threads comprise respective non-preemptive threads and the first thread is configured such that no sub-thread in the running state is suspended to allow release of the processing core by the first thread for use by the second thread, the multiple suspensions of the first thread each occurring in conjunction with a switch between sub-threads of the first thread.

9. The apparatus of claim 7 wherein generating performance measurements for respective ones of the sub-threads of the first thread based at least in part on the cumulative suspend time of the first thread comprises:
    generating a ready time measurement for a particular one of the sub-threads; and
    adjusting the ready time measurement based at least in part on the cumulative suspend time of the first thread;
    wherein the adjusted ready time measurement is indicative of an amount of time the sub-thread spent in the ready state while the first thread was not suspended.

10. The apparatus of claim 7 wherein generating performance measurements for respective ones of the sub-threads of the first thread based at least in part on the cumulative suspend time of the first thread comprises:
    generating a suspend time measurement for a particular one of the sub-threads; and
    adjusting the suspend time measurement based at least in part on the cumulative suspend time of the first thread;
    wherein the adjusted suspend time measurement is indicative of an amount of time the sub-thread spent in the suspended state while the first thread was not suspended.

11. The apparatus of claim 1 wherein maintaining a cumulative suspend time of the first thread over multiple suspensions of the first thread comprises, for each of the multiple suspensions of the first thread:
    taking a first timestamp to indicate start of the suspension;
    taking a second timestamp to indicate resumption of the first thread from the suspension; and
    adding a time interval corresponding to a difference between the first and second timestamps to the cumulative suspend time.

12. The apparatus of claim 1 wherein maintaining a cumulative suspend time of the first thread over multiple suspensions of the first thread comprises, for each of the multiple suspensions of the first thread, storing a current value of the cumulative suspend time in association with a current value of a suspension number counter that is incremented with each of the multiple suspensions of the first thread.

13. The apparatus of claim 12 wherein generating performance measurements for respective ones of the sub-threads of the first thread based at least in part on the cumulative suspend time of the first thread comprises:
    taking a first timestamp to indicate start of a performance interval;
    storing a starting value of the suspension number counter in conjunction with taking the first timestamp;
    taking a second timestamp to indicate end of the performance interval;
    storing an ending value of the suspension number counter in conjunction with taking the second timestamp;
    utilizing the starting and ending values of the suspension number counter to determine respective corresponding values of the cumulative suspend time of the first thread; and
    adjusting a difference between the first and second timestamps based at least in part on a difference between the corresponding values of the cumulative suspend time of the first thread.

14. A method comprising:
    monitoring performance of a first thread of a first application executing on one of a plurality of processing cores of a storage system;
    the first thread comprising an internal scheduler configured to control switching between a plurality of sub-threads of the first thread, and an external scheduler configured to control release of the processing core by the first thread for use by at least a second thread of a second application different than the first application;
    in conjunction with monitoring the performance of the first thread in executing the first application, maintaining a cumulative suspend time of the first thread over multiple suspensions of the first thread, one or more of the multiple suspensions allowing at least the second thread of the second application to execute on the processing core; and
    generating performance measurements for respective ones of the sub-threads of the first thread based at least in part on the cumulative suspend time of the first thread.

15. The method of claim 14 wherein maintaining a cumulative suspend time of the first thread over multiple suspensions of the first thread comprises, for each of the multiple suspensions of the first thread:
    taking a first timestamp to indicate start of the suspension;
    taking a second timestamp to indicate resumption of the first thread from the suspension; and
    adding a time interval corresponding to a difference between the first and second timestamps to the cumulative suspend time.

16. The method of claim 14 wherein maintaining a cumulative suspend time of the first thread over multiple suspensions of the first thread comprises, for each of the multiple suspensions of the first thread, storing a current value of the cumulative suspend time in association with a current value of a suspension number counter that is incremented with each of the multiple suspensions of the first thread.

17. The method of claim 16 wherein generating performance measurements for respective ones of the sub-threads of the first thread based at least in part on the cumulative suspend time of the first thread comprises:
    taking a first timestamp to indicate start of a performance interval;
    storing a starting value of the suspension number counter in conjunction with taking the first timestamp;

taking a second timestamp to indicate end of the performance interval;

storing an ending value of the suspension number counter in conjunction with taking the second timestamp;

utilizing the starting and ending values of the suspension number counter to determine respective corresponding values of the cumulative suspend time of the first thread; and adjusting a difference between the first and second timestamps based at least in part on a difference between the corresponding values of the cumulative suspend time of the first thread.

18. A computer program product comprising a non-transitory processor-readable storage medium having stored therein program code of one or more software programs, wherein the program code when executed by at least one processing device comprising a processor coupled to a memory, causes said at least one processing device:

to monitor performance of a first thread of a first application executing on one of a plurality of processing cores of a storage system;

the first thread comprising an internal scheduler configured to control switching between a plurality of sub-threads of the first thread, and an external scheduler configured to control release of the processing core by the first thread for use by at least a second thread of a second application different than the first application;

in conjunction with monitoring the performance of the first thread in executing the first application, to maintain a cumulative suspend time of the first thread over multiple suspensions of the first thread, one or more of the multiple suspensions allowing at least the second thread of the second application to execute on the processing core; and to generate performance measurements for respective ones of the sub-threads of the first thread based at least in part on the cumulative suspend time of the first thread.

19. The computer program product of claim 18 wherein maintaining a cumulative suspend time of the first thread over multiple suspensions of the first thread comprises, for each of the multiple suspensions of the first thread:

taking a first timestamp to indicate start of the suspension;

taking a second timestamp to indicate resumption of the first thread from the suspension; and adding a time interval corresponding to a difference between the first and second timestamps to the cumulative suspend time.

20. The computer program product of claim 18 wherein maintaining a cumulative suspend time of the first thread over multiple suspensions of the first thread comprises, for each of the multiple suspensions of the first thread, storing a current value of the cumulative suspend time in association with a current value of a suspension number counter that is incremented with each of the multiple suspensions of the first thread.

* * * * *